United States Patent
Fujiwara et al.

(10) Patent No.: US 8,909,441 B2
(45) Date of Patent: Dec. 9, 2014

(54) DRIVING POWER SOURCE ROTATIONAL SPEED CONTROL DEVICE AND DRIVING POWER SOURCE ROTATIONAL SPEED CONTROL METHOD

(75) Inventors: Hiroya Fujiwara, Toyota (JP); Akira Hino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 454 days.

(21) Appl. No.: 12/452,399

(22) PCT Filed: Nov. 12, 2008

(86) PCT No.: PCT/IB2008/003041
§ 371 (c)(1),
(2), (4) Date: Dec. 29, 2009

(87) PCT Pub. No.: WO2009/063290
PCT Pub. Date: May 22, 2009

(65) Prior Publication Data
US 2010/0235061 A1    Sep. 16, 2010

(30) Foreign Application Priority Data
Nov. 16, 2007   (JP) ................................. 2007-298067

(51) Int. Cl.
| | | |
|---|---|---|
| B60W 10/06 | (2006.01) | |
| B60W 10/107 | (2012.01) | |
| B60W 30/188 | (2012.01) | |
| F16H 61/662 | (2006.01) | |

(52) U.S. Cl.
CPC ............ *B60W 10/06* (2013.01); *B60W 10/107* (2013.01); *B60W 30/1882* (2013.01); *F16H 61/66259* (2013.01); *B60W 2510/0604* (2013.01); *B60W 2510/0638* (2013.01); *B60W 2510/1015* (2013.01); *B60W 2510/104* (2013.01); *B60W 2510/1045* (2013.01); *B60W 2510/107* (2013.01); *B60W 2520/10* (2013.01); *B60W 2540/10* (2013.01); *B60W 2540/103* (2013.01); *B60W 2540/106* (2013.01); *B60W 2540/16* (2013.01); *B60W 2710/0661* (2013.01); *B60W 2710/0666* (2013.01); *B60W 2710/10* (2013.01); *B60W 2710/105* (2013.01)
USPC .................. 701/54; 701/41; 701/51; 701/60; 701/70; 477/42; 477/100; 477/109; 477/118; 180/197; 180/293

(58) Field of Classification Search
CPC ..... B60W 10/06; B60W 20/00; B60W 10/08; B60W 2710/0666; B60W 30/18
USPC ......... 701/60, 61, 70, 107, 93, 96, 41, 31, 54, 701/22, 102; 700/301, 86; 303/161, 112; 358/1.9; 477/3, 39, 40, 41, 42, 43, 44, 477/45
See application file for complete search history.

(56) References Cited

U.S. PATENT DOCUMENTS 4,701,853 A    10/1987  Osanai
4,999,774 A *  3/1991   Tokoro et al. ................... 701/61
(Continued)

FOREIGN PATENT DOCUMENTS

| EP | 1 787 942 A1 | | 5/2007 |
| JP | A 11-063203 | | 3/1999 |
| JP | 2006-051842 | * | 2/2006 |
| JP | A 2006-051842 | | 2/2006 |
| WO | WO 2006016666 A1 | * | 2/2006 |

OTHER PUBLICATIONS

JPO machine translation-jp2006-051842.pdf translated to english.*

(Continued)

*Primary Examiner* — Helal A Algahaim
*Assistant Examiner* — Jelani Smith
(74) *Attorney, Agent, or Firm* — Oliff PLC

(57) ABSTRACT

A driving power source rotational speed control device is provided in a vehicle outputs power of a rotary driving power source via a continuously variable transmission as motive power, that changes the rotational speed of the rotary driving power source in association with changes in the vehicle speed when acceleration is requested. The control device includes: acceleration/deceleration state determination means determines whether the vehicle is accelerating or decelerating when acceleration is requested; and rotary driving power source rotational speed change setting means sets the change gradient of the rotary driving power source rotational speed to establish the association of the rotary driving power source rotational speed with changes in the vehicle speed when acceleration is requested. The rotary driving power source rotational speed change setting means suppresses reductions in the rotary driving power source rotational speed when the acceleration/deceleration state determination means determines that the vehicle is decelerating.

13 Claims, 18 Drawing Sheets

(56) References Cited

U.S. PATENT DOCUMENTS

| | | | | |
|---|---|---|---|---|
| 5,618,243 | A | * | 4/1997 | Kondo et al. ............... 477/118 |
| 5,655,995 | A | * | 8/1997 | Kondo et al. ............... 477/155 |
| 6,063,002 | A | * | 5/2000 | Nobumoto et al. ........... 477/41 |
| 6,522,024 | B1 | * | 2/2003 | Takaoka et al. ............ 290/40 C |
| 7,788,010 | B2 | * | 8/2010 | Kondo et al. ................ 701/61 |
| 2004/0153233 | A1 | * | 8/2004 | Minowa et al. .............. 701/96 |
| 2006/0014606 | A1 | * | 1/2006 | Sporl et al. .................. 477/42 |
| 2006/0017414 | A1 | * | 1/2006 | Joe et al. .................... 318/432 |
| 2008/0027614 | A1 | * | 1/2008 | Field et al. .................. 701/60 |
| 2009/0043468 | A1 | * | 2/2009 | Kondo et al. ................ 701/61 |
| 2009/0118085 | A1 | * | 5/2009 | Heap .............................. 477/5 |

OTHER PUBLICATIONS

International Search Report issued in corresponding International Application No. PCT/IB2008/003041, mailed Apr. 17, 2009.

Written Opinion of the International Search Authority issued in corresponding International Application No. PCT/IB2008/003041 mailed Apr. 17, 2009.

Translation and Japanese-language Office Action issued in corresponding Japanese Application No. 2007-298067, drafted Oct. 28, 2009.

* cited by examiner

DRIVING POWER SOURCE ROTATIONAL SPEED CONTROL DEVICE AND DRIVING POWER SOURCE ROTATIONAL SPEED CONTROL METHOD

BACKGROUND OF THE INVENTION

1. Field of the Invention

The present invention relates to a driving power source rotational speed control device and a driving power source rotational speed control method, for use in a vehicle that outputs power of a rotary driving power source via a continuously variable transmission as driving power for traveling, that changes the rotational speed of the rotary driving power source in association with changes in the vehicle speed when acceleration is requested.

2. Description of the Related Art

Japanese Patent Application Publication No. 2006-51842 (JP-A-2006-51842) describes a device, used in a vehicle equipped with a continuously variable transmission, that increases the output rotational speed of a rotary driving power source, such as an internal combustion engine, in association with an increase in the vehicle speed when acceleration is requested, in order to obtain sufficient acceleration for a requested output (page 12 and FIGS. 7 to 12). The device of JP-A-2006-51842 corrects an acceleration target input shaft speed (the target output rotational speed of the rotary driving power source) using a vehicle speed change correction amount, so that it increases in association with an increase in the vehicle speed, even if there is no change in the accelerator pedal depression amount.

However, the vehicle may decelerate due to an increase in the travel resistance, such as an increase in the road gradient, even when acceleration is requested. When such deceleration occurs, the target output rotational speed decreases as a result of correction using the vehicle speed change correction amount, because the output rotational speed of the rotary driving power source is changed in association with the vehicle speed as discussed above.

In addition to deceleration due to the travel resistance, reducing the rotary driving power source output rotational speed also makes the driving power insufficient to further decelerate the vehicle. This may make the driver feel uncomfortable.

SUMMARY OF THE INVENTION

The present invention is to save the driver of a vehicle, which includes a continuously variable transmission and in which the rotary driving power source rotational speed is changed in association with changes in the vehicle speed, from feeling uncomfortable, even if the vehicle decelerates due to an increase in the travel resistance or the like when acceleration is requested.

A first aspect of the present invention relates to a driving power source rotational speed control device. The driving power source rotational speed control device, provided in a vehicle that outputs power of a rotary driving power source via a continuously variable transmission as driving power for traveling, that changes a rotational speed of the rotary driving power source in association with changes in vehicle speed when acceleration is requested. The driving power source rotational speed control device includes: acceleration/deceleration state determination means for determining whether the vehicle is accelerating or decelerating when acceleration is requested; and rotary driving power source rotational speed change setting means for setting a change gradient of the rotary driving power source rotational speed to establish the association of the rotary driving power source rotational speed with changes in the vehicle speed when acceleration is requested, wherein the rotary driving power source rotational speed change setting means also suppresses reductions in the rotational speed of the rotary driving power source if the acceleration/deceleration state determination means determines that the vehicle is decelerating.

The rotary driving power source rotational speed change setting means suppresses lowering of the rotary driving power source rotational speed, which is caused to change in association with changes in the vehicle speed, in the case where the acceleration/deceleration state determination means determines that the vehicle is in the deceleration compared to the case where it is determined that the vehicle is in the acceleration state. Consequently, lowering of the rotary driving power source rotational speed is reduced, or the rotary driving power source rotational speed is not lowered at all, even if the vehicle decelerates due to an increase in the travel resistance or the like when acceleration is requested. Therefore, the driving power is not likely to become insufficient, or does not become insufficient, to further decelerate the vehicle. This can save the driver from feeling uncomfortable.

The rotary driving power source rotational speed change setting means may reduce the association of the rotary driving power source rotational speed with changes in the vehicle speed if the acceleration/deceleration state determination means determines that the vehicle decelerating compared to a case where it is determined that the vehicle is accelerating.

As described above, it is possible to suppress lowering of the rotary driving power source rotational speed by reducing the association of the rotary driving power source rotational speed with changes in the vehicle speed. Consequently, lowering of the rotary driving power source rotational speed is reduced, or the rotary driving power source rotational speed is not lowered at all, even if the vehicle decelerates due to an increase in the travel resistance or the like when acceleration is requested. Hence, the driving power is not likely to become insufficient, or does not become insufficient, to further decelerate the vehicle. This can save the driver from feeling uncomfortable.

The rotary driving power source rotational speed change setting means may reduce the association by adjusting the change gradient for the rotational speed of the rotary driving power source in accordance with changes in the vehicle speed.

In establishing the association of the rotary driving power source rotational speed with changes in the vehicle speed when acceleration is requested by setting the change gradient of the rotary driving power source rotational speed relative to changes in the vehicle speed, the rotary driving power source rotational speed change setting means may set an absolute value of the change gradient to be smaller when the acceleration/deceleration state determination means determines that the vehicle is decelerating than when the acceleration/deceleration state determination means determines that the vehicle is accelerating.

Since the absolute value of the change gradient of the rotary driving power source rotational speed is set to be smaller in the case where the it is determined that the vehicle is in the deceleration state than in the case where it is determined that the vehicle is in the acceleration state, lowering of the rotary driving power source rotational speed is reduced, or the rotary driving power source rotational speed is not lowered at all, even if the vehicle decelerates due to an increase in the travel resistance or the like when acceleration is requested. Therefore, the driving power is not likely to become insufficient, or does not become insufficient, to further decelerate the vehicle. This can save the driver from feeling uncomfortable.

The rotary driving power source rotational speed change setting means may establish no association of the rotary driving power source rotational speed with changes in the vehicle speed when the acceleration/deceleration state determination means determines that the vehicle is decelerating.

As described above, in the deceleration state, the rotary driving power source rotational speed may be caused to change in no association with changes in the vehicle speed. That is, the change gradient of the rotary driving power source rotational speed relative to changes in the vehicle speed may be set to 0. Consequently, the rotary driving power source rotational speed is not lowered in association with changes in the vehicle speed, even if the vehicle decelerates due to an increase in the travel resistance or the like when acceleration is requested. Therefore, the driving power is not likely to become insufficient, or does not become insufficient, to further decelerate the vehicle. This can save the driver from feeling uncomfortable.

The rotary driving power source rotational speed change setting means may set a minimum rotational speed if the acceleration/deceleration state determination means determines that the vehicle is decelerating.

As described above, lowering of the rotary driving power source rotational speed may be suppressed by setting a lower limit. Consequently, lowering of the rotary driving power source rotational speed is suppressed reliably by setting a lower limit, even if the vehicle decelerates due to an increase in the travel resistance or the like when acceleration is requested. Hence, the driving power is not likely to become insufficient, or does not become insufficient, to further decelerate the vehicle. This can save the driver from feeling uncomfortable.

The association of the rotary driving power source rotational speed with changes in the vehicle speed is established by changing the target rotational speed of the rotary driving power source in association with changes in the vehicle speed, and the rotary driving power source rotational speed change setting means may suppress reductions of the rotary driving power source rotational speed by adjusting the target rotational speed if the acceleration/deceleration state determination means determines that the vehicle is decelerating.

It is possible to actually change the rotational speed of the rotary driving power source in association with changes in the vehicle speed by changing the target rotational speed of the rotary driving power source in association with changes in the vehicle speed. Accordingly, lowering of the rotary driving power source rotational speed can be suppressed by adjusting the target rotational speed.

The rotary driving power source rotational speed change setting means may change the rotary driving power source rotational speed in association with changes in a requested output as well as changes in the vehicle speed.

As described above, it is possible to control the rotary driving power source smoothly according to requests from the driver by changing the rotary driving power source rotational speed in association with changes in a requested output as well as changes in the vehicle speed. The rotary driving power source may be an internal combustion engine.

Examples of the rotary driving power source include an internal combustion engines such as a gasoline engine and a diesel engine. In a vehicle equipped with an internal combustion engine, lowering of the internal combustion engine rotational speed is reduced, or the internal combustion engine rotational speed is not lowered at all, even if the vehicle decelerates due to an increase in the travel resistance or the like when acceleration is requested. Therefore, the driving power is not likely to become insufficient, or does not become insufficient, to further decelerate the vehicle. This can save the driver from feeling uncomfortable.

A target input shaft speed of the continuously variable transmission and a target output torque of the rotary driving power source may be calculated, and a gear ratio of the continuously variable transmission is controlled based on the target input shaft speed, in order to achieve target driving power, which is calculated based on the requested output and the vehicle speed.

A second aspect of the present invention relates to a driving power source rotational speed control method. The driving power source rotational speed control method, provided in a vehicle that outputs power of a rotary driving power source via a continuously variable transmission as driving power for traveling, that changes a rotational speed of the rotary driving power source in association with changes in vehicle speed when acceleration is requested. The driving power source rotational speed control method includes: determining whether the vehicle is accelerating or decelerating when acceleration is requested; and setting a change gradient of the rotary driving power source rotational speed to establish the association of the rotary driving power source rotational speed with changes in the vehicle speed when acceleration is requested, wherein the rotary driving power source rotational speed change setting means also suppresses reductions in the rotational speed of the rotary driving power source rotational speed if the vehicle is decelerating.

As described above, by executing the control discussed above in the vehicle in which the gear ratio of the continuously variable transmission is controlled, lowering of the internal combustion engine rotational speed is reduced, or the internal combustion engine rotational speed is not lowered at all, even if the vehicle decelerates due to an increase in the travel resistance or the like when acceleration is requested. Therefore, the driving power is not likely to become insufficient, or does not become insufficient, to further decelerate the vehicle. This can save the driver from feeling uncomfortable.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
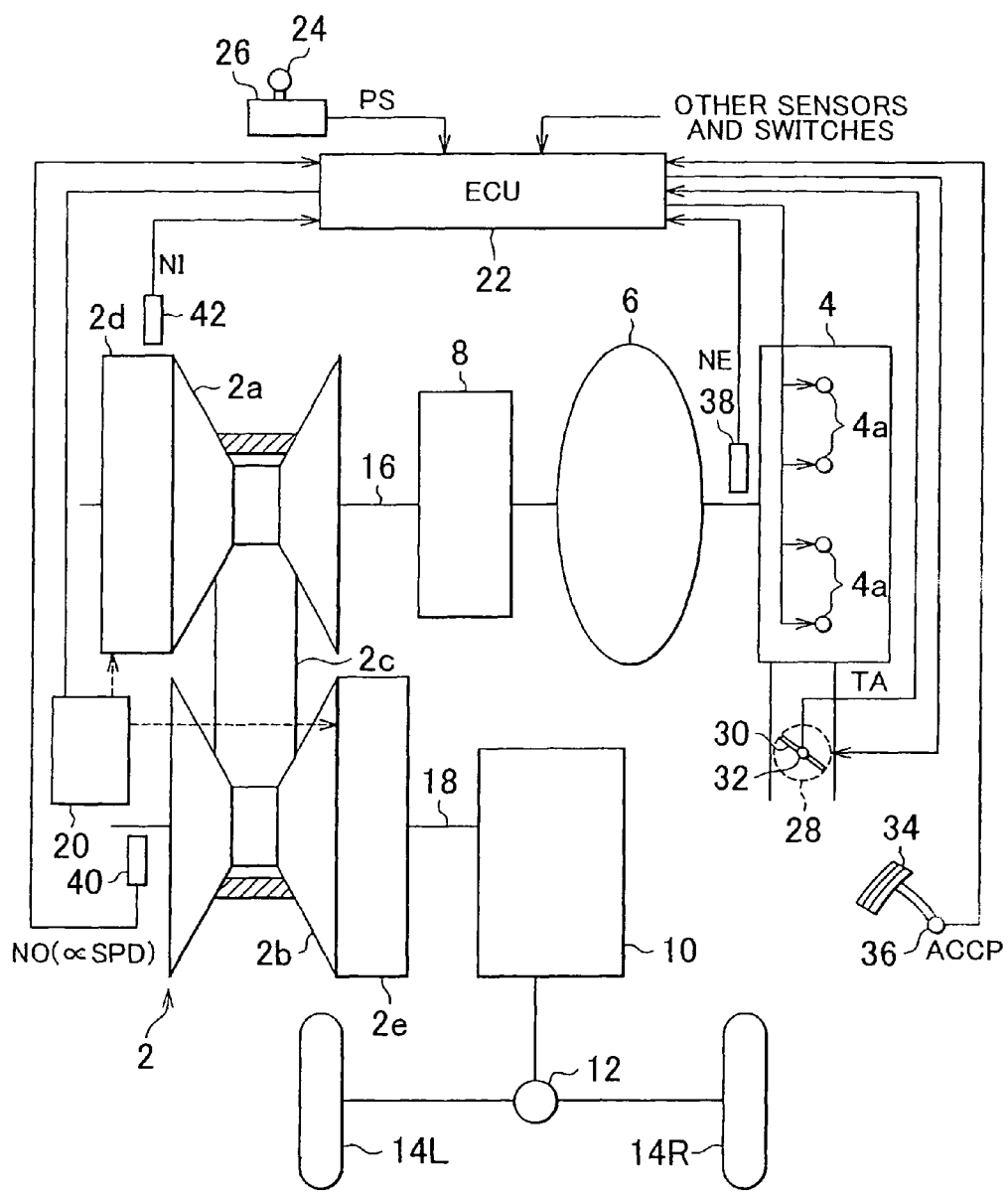
FIG. 1 is a block diagram showing a power transmission mechanism of a vehicle using a CVT in accordance with the first embodiment.

FIG. 1 is a block diagram showing a power transmission mechanism using a belt-type continuously variable transmission (hereinafter referred to as "CVT") 2 provided in a vehicle to which the present invention is applied. An internal combustion engine 4 is provided as a source of rotary driving power for traveling. The internal combustion engine 4 may be a gasoline engine, a diesel engine, or the like. Here, it is described as a gasoline engine (hereinafter referred to as "engine") 4.

The output of the engine 4 is transmitted from a torque converter 6 via a forward/reverse travel switching device 8, the CVT 2, and a reduction gear 10 to a differential gear device 12, and distributed to left and right driving wheels 14L, 14R. The CVT 2 includes an input-side variable pulley 2a provided on its input shaft 16 and having a variable effective diameter, an output-side variable pulley 2b provided on its output shaft 18 and having a variable effective diameter, and a power transmission belt 2c wound around in respective V-grooves of the variable pulleys 2a, 2b. With this configuration, power is transmitted via friction between the power transmission belt 2c and the inner wall surfaces of the V-grooves of the variable pulleys 2a, 2b. The variable pulleys 2a, 2b respectively include an input hydraulic cylinder 2d and an output hydraulic cylinder 2e that change the V-groove width, that is, the diameter over which the power transmission belt 2c is wound. With this configuration, a hydraulic pressure control circuit 20 adjusts the amount of hydraulic oil supplied to or discharged from the hydraulic cylinders 2d, 2e to change the diameter of the variable pulleys 2a, 2b (the effective diameter of the variable pulleys 2a, 2b) to continuously vary the gear ratio γ (=input shaft speed NI/output shaft speed NO).

An electronic control unit (hereinafter referred to as "ECU") 22, which is composed primarily of a microcomputer, receives a signal that indicates the shift lever position PS from shift lever operation position detection sensor 26 that detects the position of a shift lever 24. The ECU 22 also receives a signal that indicates the throttle opening degree TA from a throttle sensor 32 that detects the opening degree of a throttle valve 30, which is driven by a throttle actuator 28, and a signal that indicates the accelerator pedal operation amount ACCP from an accelerator pedal operation amount sensor 36 that detects the operation amount of an accelerator pedal 34. The ECU 22 further receives a signal that indicates the engine speed NE from an engine speed sensor 38, a signal that indicates the vehicle speed SPD from a vehicle speed sensor 40 (which also serves as an output shaft speed sensor that detects a rotational speed NO of the output shaft 18), and a signal that indicates the input shaft speed NI of the input shaft 16 from an input shaft speed sensor 42.

In addition to the signals described above, the ECU 22 receives signals from other sensors and switches. Examples of such signals include a signal indicating the temperature of hydraulic oil in the CVT 2, a signal indicating the belt nipping force of the output-side variable pulley 2b, and a signal indicating an ignition key turn-on operation from a ignition switch that is operated by an ignition key.

The ECU 22 executes computational processes described in a program based on the received data and data stored in an internal memory, and makes an output based on the computation results. Here, the ECU 22 controls the output torque of the engine 4 of the vehicle and the gear ratio of the CVT 2 to obtain optimum acceleration and fuel economy. In the output torque control, a target output torque TE of the engine 4 is determined based on the relationship stored in advance, and the throttle opening degree TE is adjusted to obtain the target output torque TE, in order to control the output torque of the engine 4. In the gear ratio control, a target rotational speed NINT is determined based on the relationship stored in advance, and the hydraulic pressure control circuit 20 is operated to match the actual input shaft speed NI with the target rotational speed NINT, in order to adjust the gear ratio γ of the CVT 2.

In addition to the controls described above, the ECU 22 executes belt nipping force control for keeping the power transmission belt 2c under the appropriate tension, fuel injection control for supplying an amount of fuel necessary for combustion into each intake port and each cylinder by adjusting the duration for which a fuel injection valve 4a is opened, and so forth.

Figure 2:
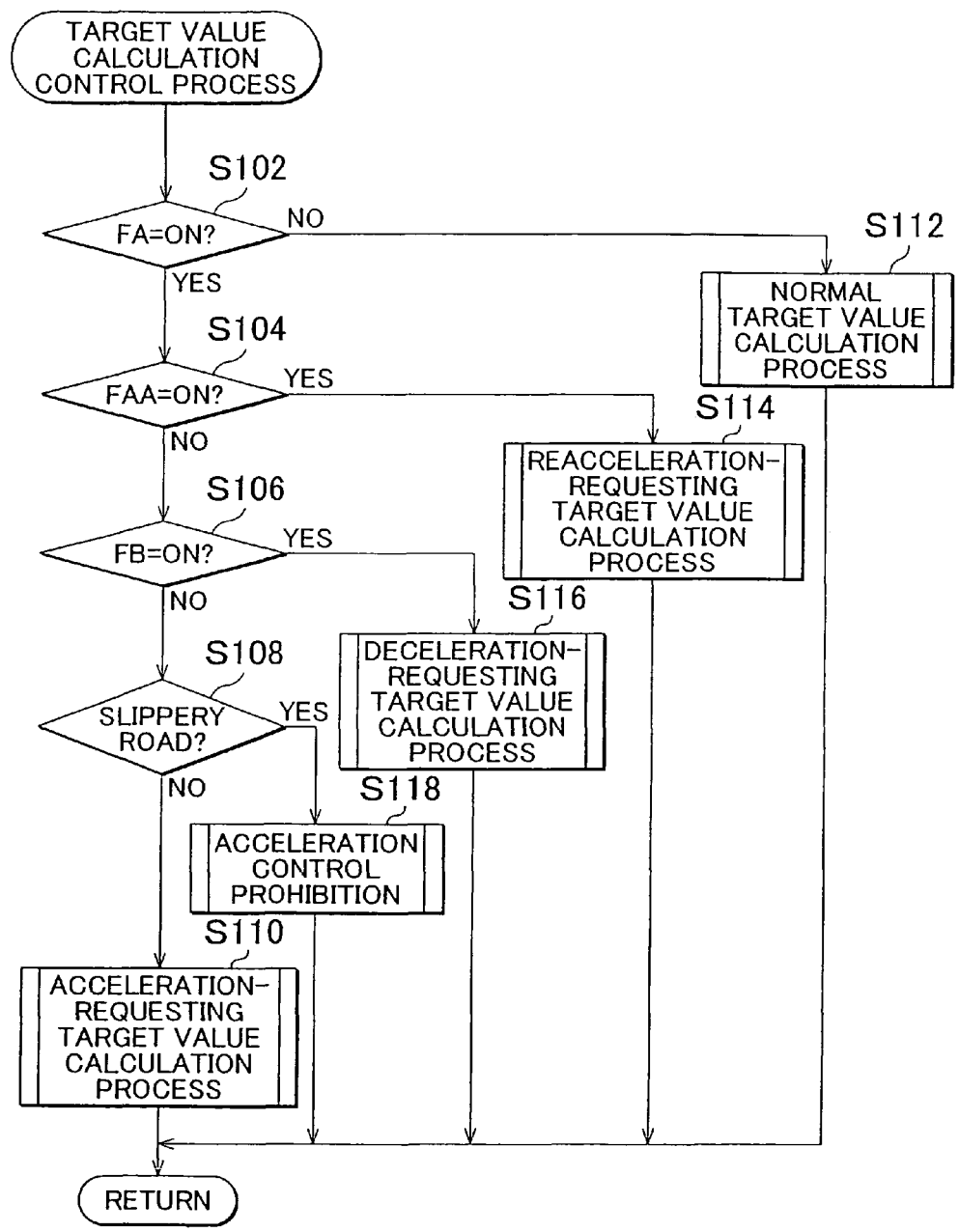
FIG. 2 is a flowchart of a target value calculation control process executed by an ECU of the first embodiment.

The rotary driving power control that is executed by the ECU 22 is described below. FIG. 2 is a flowchart of a target value calculation control process executed by the ECU 22. The process is executed at predetermined intervals, for example, several tens of milliseconds. The steps in the flowchart corresponding to individual processes are each represented by a character "S" followed by a number.

When the target value calculation control process (FIG. 2) is started, it is first determined whether an acceleration request flag FA is on (S102), in order to determine the accelerator pedal operation state. The acceleration request flag FA is on if it is determined that that acceleration is requested, based on the operation state of the accelerator pedal 34.

If the acceleration request flag FA is on (YES in S102), it is then determined whether a reacceleration request flag FAA is on (S104). The reacceleration request flag FAA is on if it is determined that acceleration is requested based on the operation state of the accelerator pedal.

If the reacceleration request flag FAA is not on (NO in S104), it is then determined whether a deceleration request flag FB is on (S106). The deceleration request flag FB is on if it is determined that deceleration is requested based on the operation state of the accelerator pedal.

Figure 3:
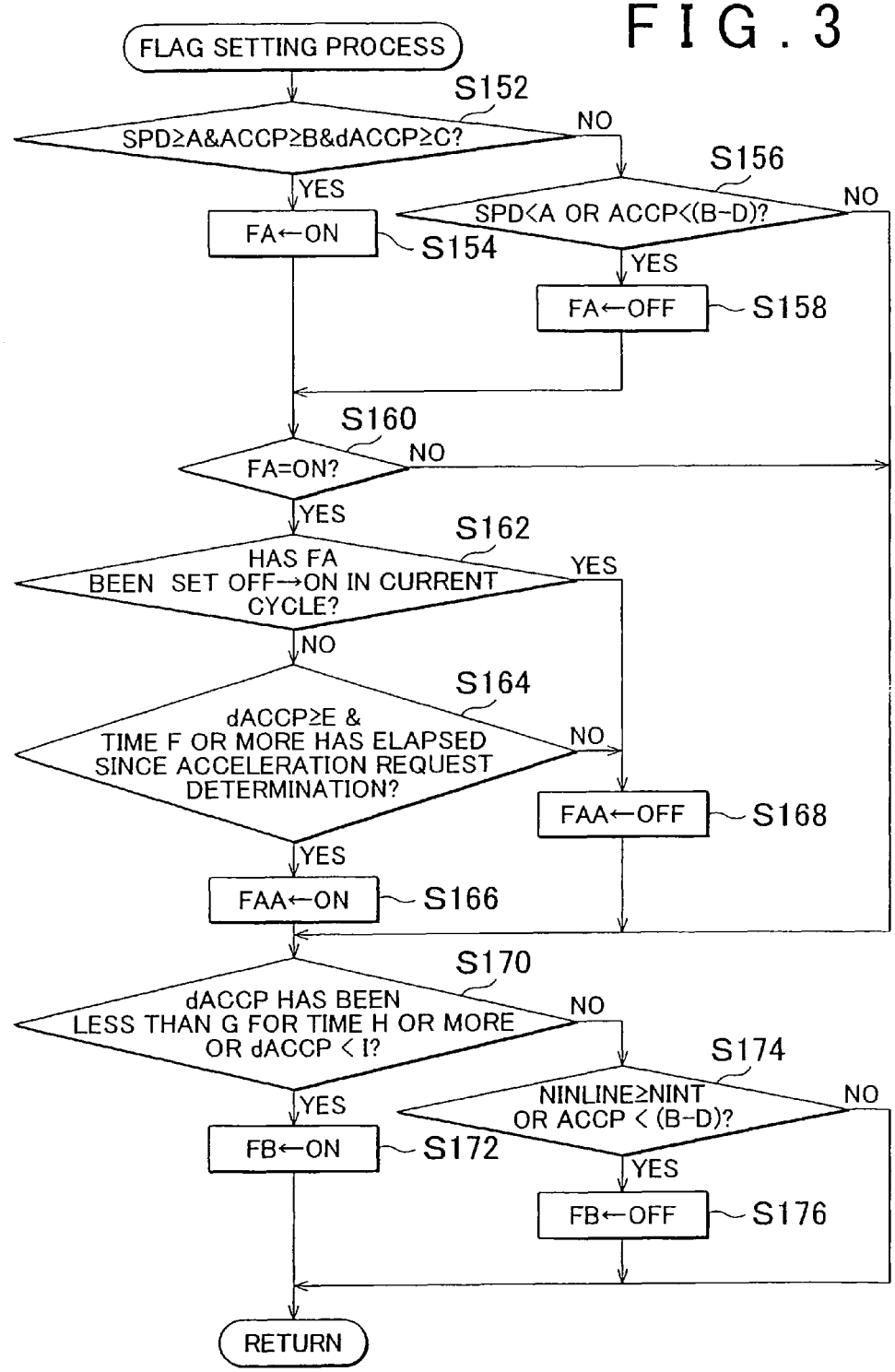
FIG. 3 is a flowchart of a flag setting process executed by the ECU of the first embodiment.

The acceleration request flag FA, the reacceleration request flag FAA, and the deceleration request flag FB are set on and off by a flag setting process shown in FIG. 3 and executed in parallel by interruption or the like.

The flag setting process (FIG. 3) will be described next. In this process, the logical multiplication of the following three conditions ((a), (b), (c)) is determined (S152): (a) the vehicle speed SPD (km/h) is equal to or exceeds a preset determination value A; (b) the accelerator pedal operation amount ACCP (%) is equal to or exceeds a preset determination value B; and (c) an accelerator pedal speed dACCP (%) is equal to or more than a preset determination value C. Here, the accelerator pedal speed dACCP indicates changes in the accelerator pedal operation amount ACCP per unit time.

If all the conditions (a), (b), and (c) are satisfied (YES in S152), the acceleration request flag FA is set on (S154). If any one of the conditions (a), (b), and (c) is not satisfied (NO in S152), it is determined whether the vehicle speed SPD is below the preset determination value A or the accelerator pedal operation amount ACCP is below a preset determination value (here, a value "B−D," which is less than the determination value B by a predetermined value D) (S156). If either or both of these conditions is or are satisfied (YES in S156), it is determined that an acceleration request operation is finished, and the acceleration request flag FA is set off (S158).

After the process of step S154 or step S158, it is determined whether the acceleration request flag FA is set on (S160). If the acceleration request flag FA is on (YES in S160), it is determined whether the acceleration request flag FA has been set on in the current control cycle (S162). If the acceleration request flag FA has not been set to on in the current cycle (NO in S162), it is determined (S164) whether the accelerator pedal speed dACCP is equal to above than a preset determination value E and at least a time period F has elapsed since the acceleration request determination (S152). If these two conditions are satisfied (YES in S164), the reacceleration request flag FAA is set on (S166). If the determination result of step S162 is YES or the determination, result of step S164 is NO, the reacceleration request flag FAA is set off (S168).

If the determination result of step S156 or step S160 is NO, or after step S166 or step S168, it is determined whether the accelerator pedal speed dACCP has remained below a preset determination value G (a negative value) for at least a time period H or the accelerator pedal speed dACCP is below a preset determination value I (<G) (S170). If any of these conditions are satisfied (YES in S170), the deceleration request flag FB is set on (S172). If any of these conditions are not satisfied (NO in S170), it is determined whether the target input shaft speed NINLINE is equal to or above the target rotational speed NINT during transition or the accelerator pedal operation amount ACCP is below the determination value (B−D) (S174). If any of these conditions are satisfied (YES in S174), the deceleration request flag FB is set off (S176). If any of these conditions are not satisfied (NO in S174), the process is temporarily exited.

Figure 4:
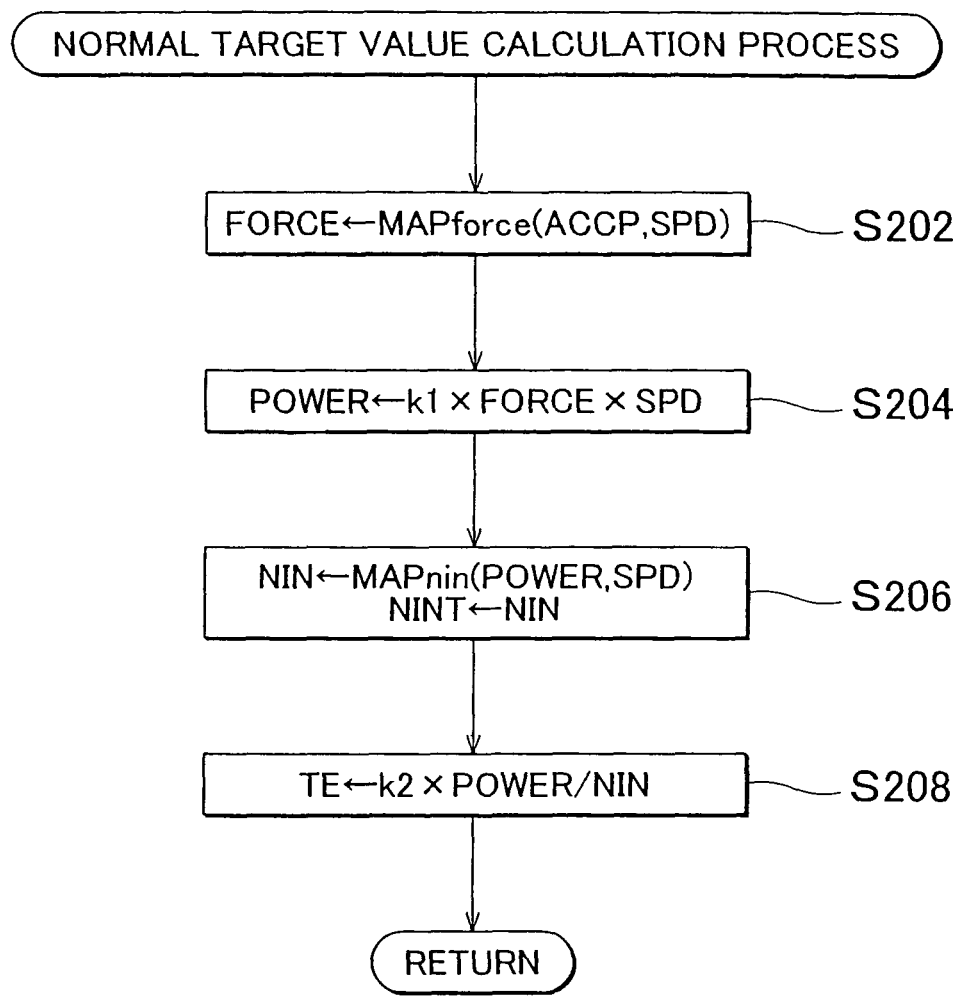
FIG. 4 is a flowchart of a normal target value calculation process executed by the ECU of the first embodiment.

In the flag setting process (FIG. 3), the processes discussed above are repeated in cycles to repeatedly set on and off the flags FA, FAA, FB. Returning to FIG. 2, the determinations of steps S102 to S106 are made based on the settings of the flags FA, FAA, FB. First, if the acceleration request flag FA is off (NO in S102), a normal target value calculation process of FIG. 4 is executed (S112).

In the normal target value calculation process (FIG. 4), a normal target drive power FORCE is first calculated based on the actual vehicle speed SPD (which is calculated based on the rotational speed NO of the output shaft 18) and the accelerator pedal operation amount ACCP (S202), using a map MAPforce stored in advance and as defined by Formula [1].

$$FORCE \leftarrow MAPforce(ACCP, SPD) \quad [1]$$

Figure 5:
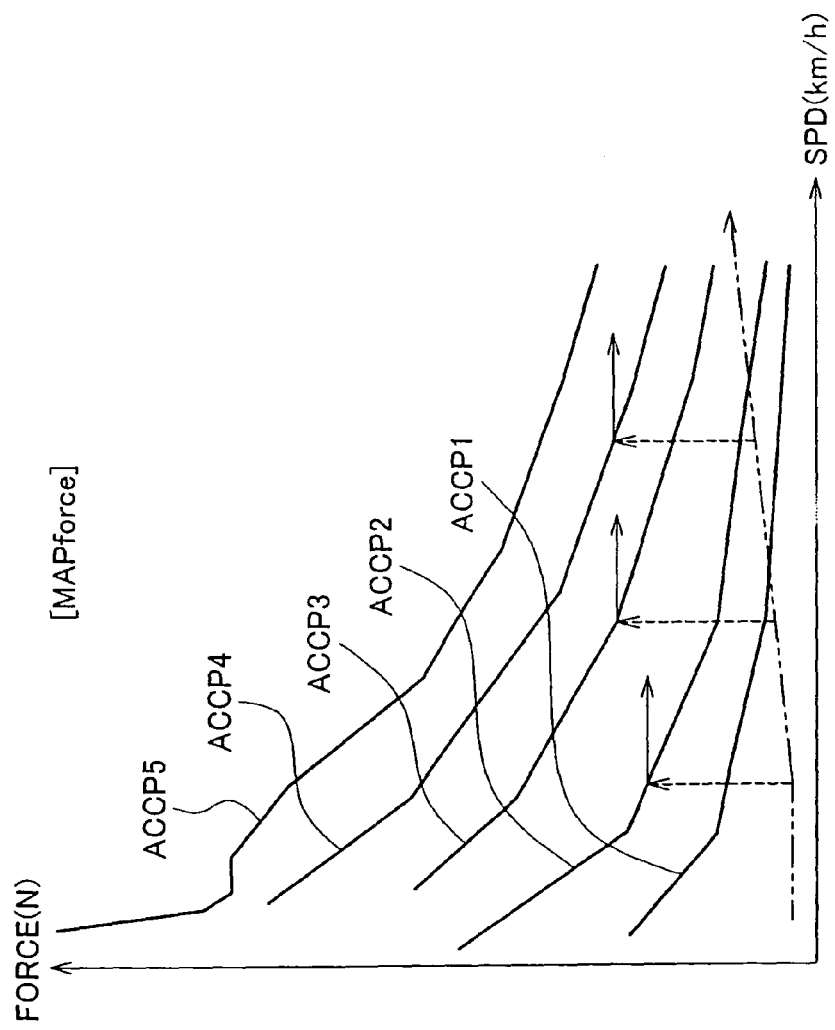
FIG. 5 is a graph showing the configuration of a map MAPforce.

The relationship defined by the map MAPforce of Formula [1] is as provided by the characteristic curves of FIG. 5. FIG. 5 shows a two-dimensional orthogonal coordinate plane having a target driving power axis (vertical axis) representing the target driving power FORCE and a vehicle speed axis (horizontal axis) representing the vehicle speed SPD. On the coordinate plane of FIG. 5, a plurality of hyperbolic curves having the accelerator pedal operation amount ACCP as a parameter (ACCP1 to ACCP5 in the drawing) are provided. One of the characteristic curves that corresponds to the current accelerator pedal operation amount ACCP is selected, and the value on the target driving power axis for a point on the selected characteristic curve that corresponds to the actual vehicle speed SPD is determined as the actual target driving power FORCE.

Then, a target output POWER is calculated based on the target driving power FORCE and the actual vehicle speed SPD (S204), using Formula [2].

$$POWER \leftarrow k1 \times FORCE \times SPD \quad [2]$$

In the formula, k1 is a conversion factor.

Then, a normal target input shaft speed NIN (rpm) is calculated-based on the normal target output POWER and the actual vehicle speed SPD (S206), using a map MAPnin and as defined by Formula [3].

$$NIN \leftarrow MAPnin(POWER, SPD) \quad [3]$$

Here, the value of the normal target input shaft speed NIN is also set to the target rotational speed NINT during transition.

Figure 6:
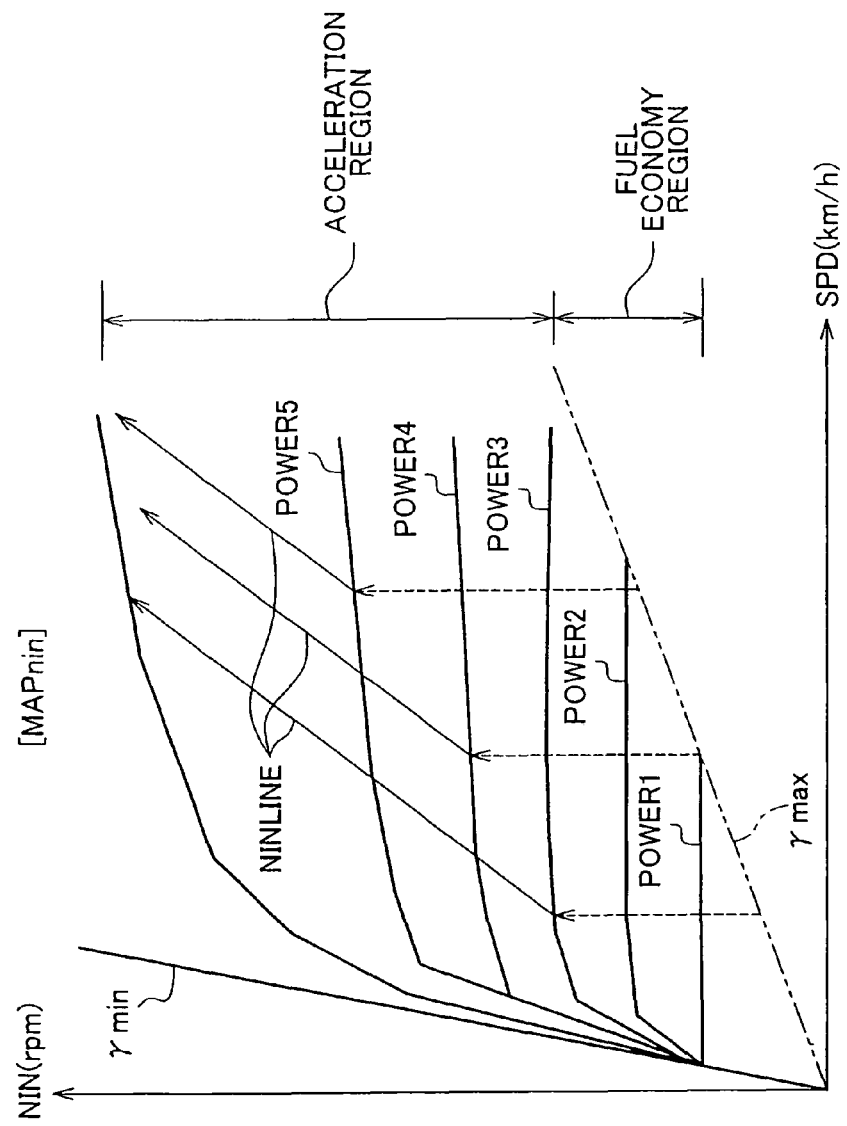
FIG. 6 is a graph showing the configuration of a map MAPnin.

The relationship defined by the map MAPnin of Formula [3] is as provided, for example, by the characteristic curves of FIG. 6. FIG. 6 shows a two-dimensional orthogonal coordinate plane having a target input shaft speed axis (vertical axis) and a vehicle speed axis (horizontal axis). On the coordinate plane of FIG. 6, a plurality of characteristic curves having the normal target output POWER as a parameter (POWER1 to POWER5 in the drawing) are provided in parallel in a fan-shaped area defined between lines representing a maximum gear ratio γmax of the CVT 2 and a minimum gear ratio γmin. One of the characteristic curves that corresponds to the actual normal target driving power POWER is selected, and the value on the target input shaft speed axis for a point on the selected characteristic curve that corresponds to the actual vehicle speed SPD is determined as the actual target input shaft speed NIN. The above characteristic curves POWER1 to POWER5 are set such that the operation point of the engine 4 moves along an optimum fuel economy curve as the engine speed NE increases.

Then, the target output torque TE is calculated based on the normal target output POWER and the normal target input shaft speed NIN (S208), using Formula [4].

$$TE \leftarrow k2 \times POWER/NIN \quad [4]$$

In the formula, k2 is a conversion factor.

When the normal target value calculation process (FIG. 4, S112 of FIG. 2) ends, the target value calculation control process (FIG. 2) is temporarily exited. Thereafter, as long as the acceleration request flag FA is off (NO in S102), the normal target value calculation process (FIG. 4, S112 of FIG. 2) continues to be executed.

Figure 7:
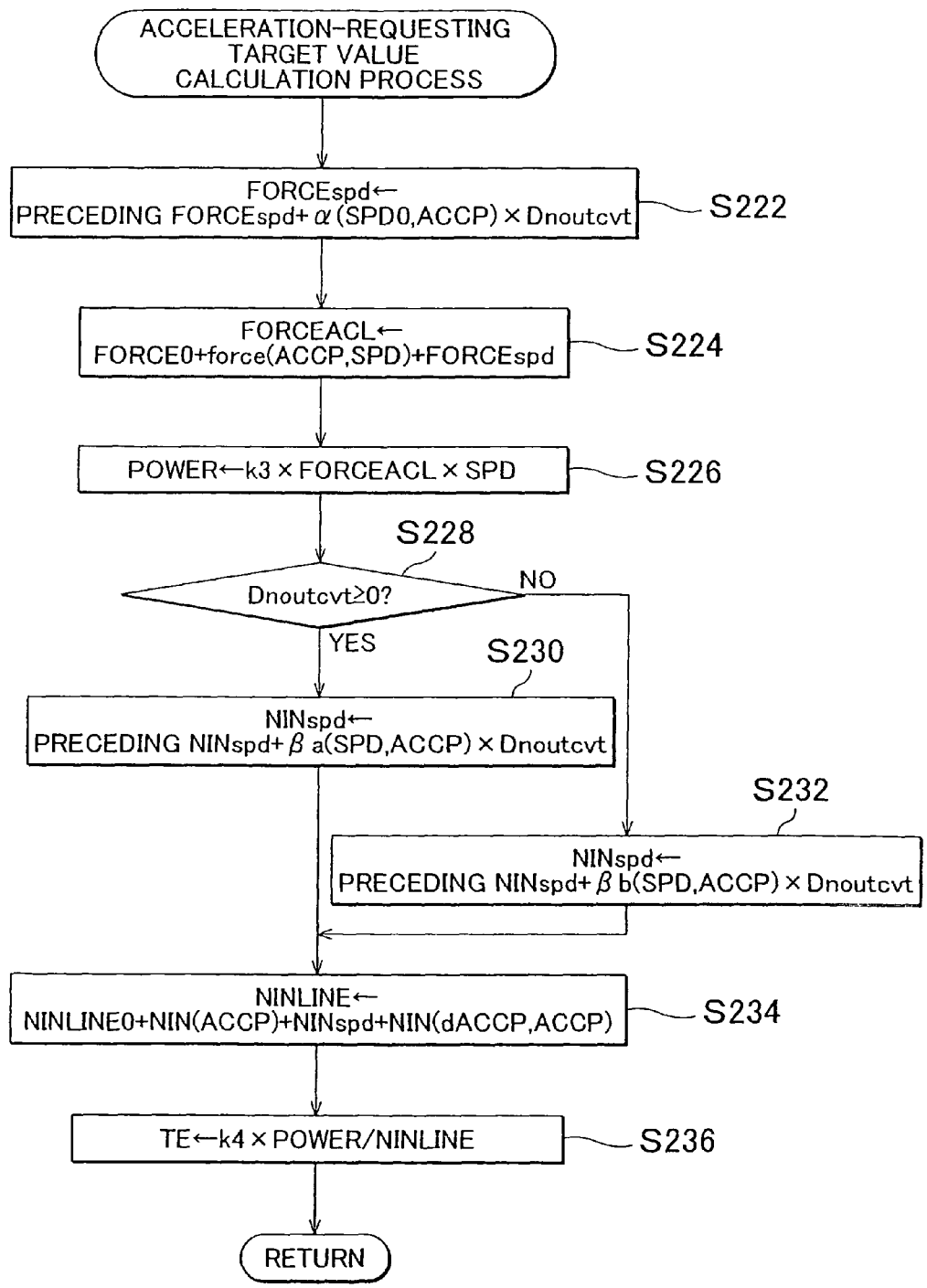
FIG. 7 is a flowchart of an acceleration-requesting target value calculation process executed by the ECU of the first embodiment.

If the acceleration request flag FA is on (YES in S102), the reacceleration request flag FAA is off (NO in S104), the deceleration request flag FB is off (NO in S106), and the vehicle is not traveling on a slippery road surface with a low friction coefficient (NO in S108), the acceleration-requesting target value calculation process shown in FIG. 7 is executed (S110). If the vehicle is traveling on a slippery road (YES in S108), acceleration control is prohibited (S118).

The acceleration-requesting target value calculation process (FIG. 7) will now be described. A vehicle speed change correction value FORCEspd (vehicle speed integral term) is first calculated (S222), using Formula [5].

$$\text{FORCE}spd \leftarrow \text{preceding FORCE}spd + \alpha(SPD0, ACCP) \times \text{Dnoutcvt} \quad [5]$$

In the formula, the vehicle speed SPD0 is the initial vehicle speed when the acceleration request flag FA is switched to on. That is, the vehicle speed change correction value FORCEspd is calculated by sequential integration based on an inclination factor $\alpha(SPD0, ACCP)$ and a vehicle speed differential Dnoutcvt. The inclination factor $\alpha(SPD0, ACCP)$ is a function of the vehicle speed SPD0 at the time immediately after the acceleration request determination is made and the accelerator pedal operation amount ACCP. In addition, the inclination factor $\alpha(SPD0, ACCP)$ is defined to decrease as the vehicle speed SPD0 at the time immediately after the acceleration request determination increases and as the accelerator pedal operation amount ACCP increases. The vehicle speed differential Dnoutcvt is the amount of change in the rotational speed NO of the output shaft 18 (which is proportional to the vehicle speed SPD) in each cycle, and corresponds to the acceleration of the vehicle in each cycle.

Then, an acceleration-requesting target driving power FORCEACL is calculated based on an acceleration-requesting initial driving power value FORCE0, an accelerator pedal depression correction value force(ACCP, SPD), and the vehicle speed change correction value (FORCEspd) (S224), as defined by Formula [6].

$$\text{FORCE}ACL \leftarrow \text{FORCE}0 + \text{force}(ACCP, SPD) + \text{FORCE}spd \quad [6]$$

In the formula, the acceleration-requesting initial driving power value FORCE0 is a value on a constant-speed travel line (the chain double-dashed line) of FIG. 5 that is commensurate with the travel resistance of the vehicle, for example, and corresponds to the vehicle speed SPD at the time immediately before the acceleration request determination. The accelerator pedal depression correction value force(ACCP, SPD) is a value corresponding to the accelerator pedal operation amount (increase amount) and the vehicle speed SPD at the time of the acceleration request, and corresponds to the length of a vertical arrow in the broken line in FIG. 5 and FIG. 8, an enlargement thereof. As is clear from FIG. 5, the accelerator pedal depression correction value force(ACCP, SPD) increases with increases in the accelerator pedal operation amount ACCP at the time of the acceleration request, and decreases with increasing vehicle speed SPD at the time of the acceleration request.

The vehicle speed change correction value FORCEspd calculated by formula [5] maintains the accelerator pedal depression correction value force(ACCP, SPD) at its initial value or decreases it from the initial value according to changes in the vehicle speed from the time of the acceleration request.

Figure 8:
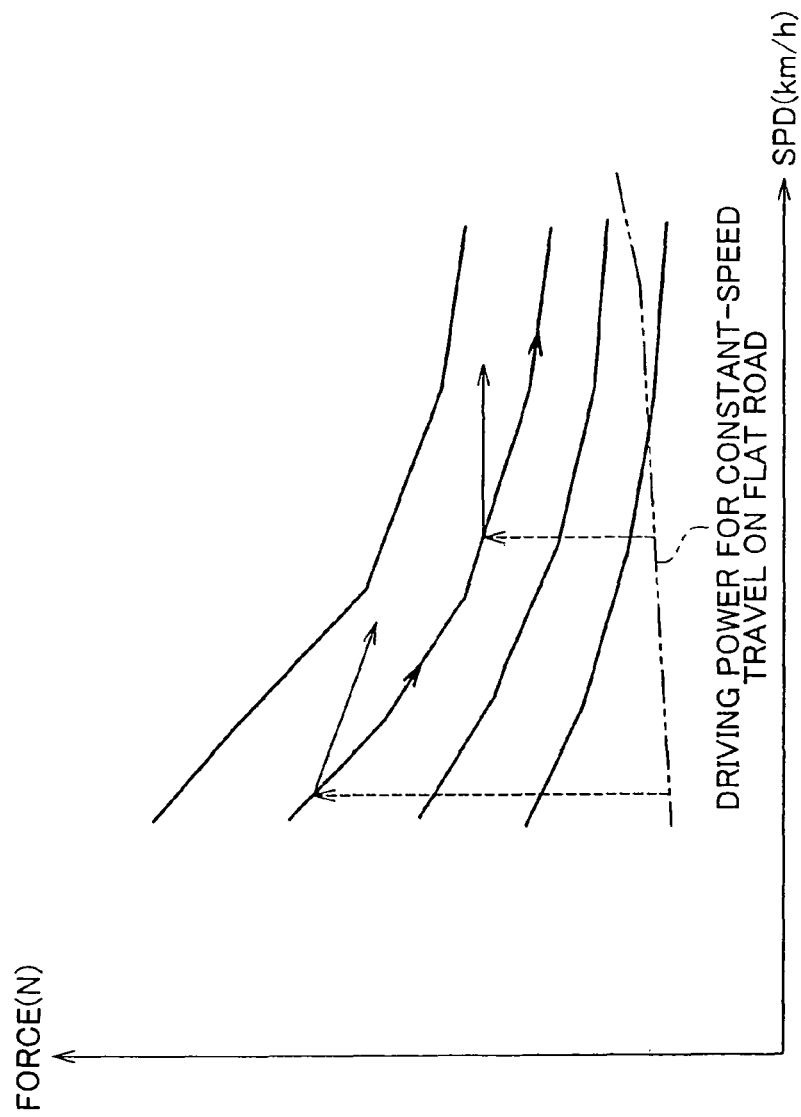
FIG. 8 is a graph showing as enlarged the relationship defined by FIG. 5.

As a result, as indicated by an arrow in the solid line in FIG. 5 and FIG. 8, an enlargement thereof, the acceleration-requesting target driving power FORCEACL is maintained constant at, or decreased at a predetermined rate from, its initial value.

Then, the target output POWER is calculated based on the acceleration-requesting target driving power FORCEACL and the actual vehicle speed SPD (S226), using Formula [7], which is the same as Formula [2] used normally.

$$\text{POWER} \leftarrow k3 \times \text{FORCE}ACL \times SPD \quad [7]$$

In Formula [7], k3 (which has the same value as k1) is a conversion factor.

Then, it is determined whether the vehicle speed differential Dnoutcvt indicates acceleration including constant-speed travel (S228). If acceleration is indicated, that is, the vehicle speed differential Dnoutcvt$\geq 0$ (YES in S228), a vehicle speed change correction value NINspd is then calculated by sequential integration based on an acceleration-state inclination factor $\beta a(SPD, ACCP)$ and the vehicle speed differential Dnoutcvt (S230), as defined by Formula [8].

$$NINspd \leftarrow \text{preceding } NINspd + \beta a(SPD, ACCP) \times \text{Dnoutcvt} \quad [8]$$

Figure 9:
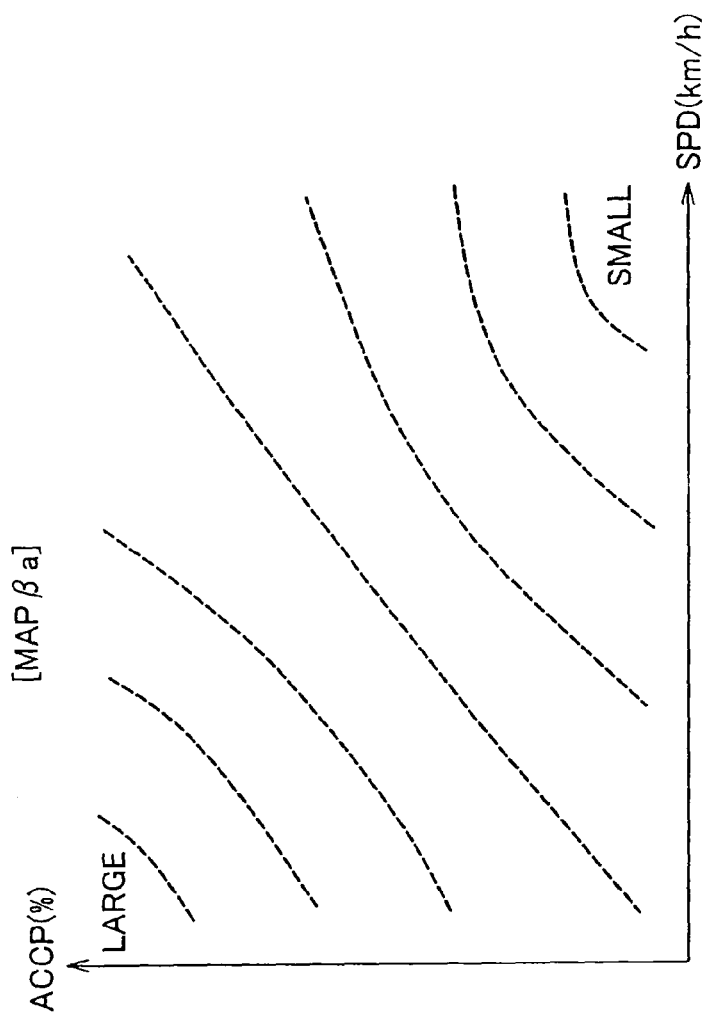
FIG. 9 is a graph showing the configuration of a map MAPβa used when acceleration is requested.

The acceleration-state inclination factor $\beta a(SPD, ACCP)$ is equivalent to the increase gradient of the vehicle speed change correction value NINspd, which corresponds to the vehicle speed differential Dnoutcvt in the acceleration state, and is a positive value calculated using a map MAP$\beta a$ shown in FIG. 9 based on the vehicle speed SPD and the accelerator pedal operation amount ACCP. That is, as indicated by broken lines resembling contour lines, the acceleration-state inclination factor $\beta a(SPD, ACCP)$ decreases as the vehicle speed SPD increases and increases as the vehicle speed SPD decreases, and increases as the accelerator pedal operation amount ACCP increases and decreases as the accelerator pedal operation amount ACCP decreases.

If deceleration is indicated, that is, the vehicle speed differential Dnoutcvt<0 (NO in S228), the vehicle speed change correction value NINspd is then calculated by sequential integration based on a deceleration-state inclination factor $\beta b(SPD, ACCP)$ and the vehicle speed differential Dnoutcvt (S232), as defined by Formula [9].

$$NINspd \leftarrow \text{preceding } NINspd + \beta b(SPD, ACCP) \times \text{Dnoutcvt} \quad [9]$$

Figure 10:
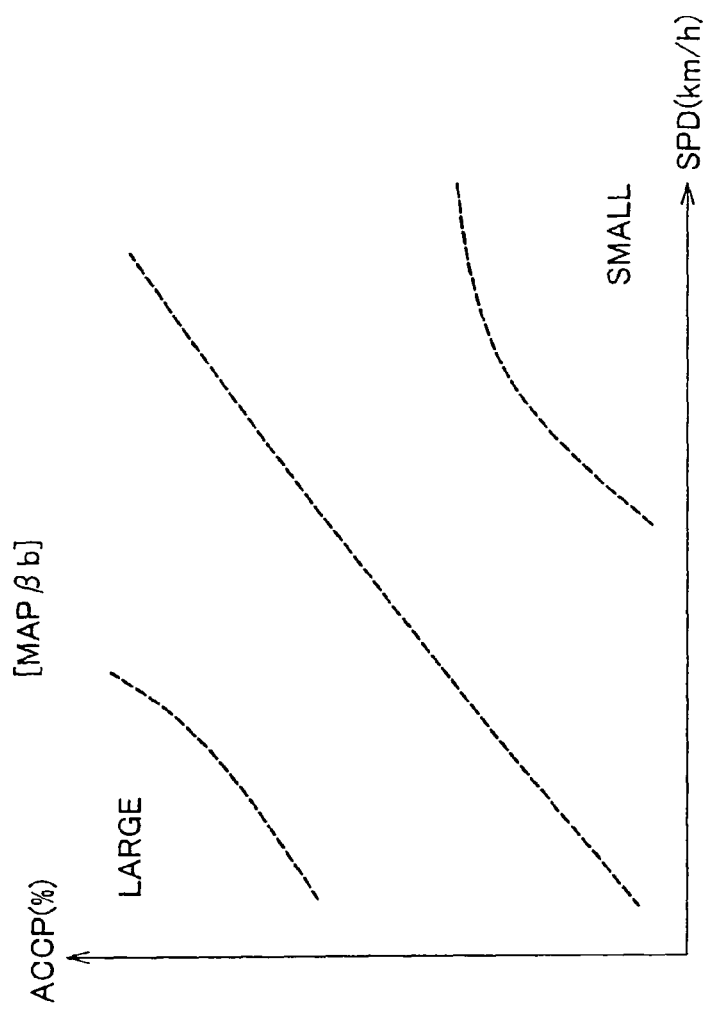
FIG. 10 is a graph showing the configuration of a map MAPβb used when acceleration is requested.

The deceleration-state inclination factor $\beta b(SPD, ACCP)$ is equivalent to the increase gradient of the vehicle speed change correction value NINspd relative to the vehicle speed differential Dnoutcvt in the deceleration state that has occurred when acceleration is requested. Here, because the vehicle speed differential Dnoutcvt<0, the deceleration-state inclination factor $\beta b(SPD, ACCP)$ is actually a decrease gradient. The deceleration-state inclination factor $\beta b(SPD, ACCP)$ is a positive value calculated based on the vehicle speed SPD and the accelerator pedal operation amount ACCP using a map $\beta b$ shown in FIG. 10. That is, the deceleration-state inclination factor $\beta b(SPD, ACCP)$ decreases as the vehicle speed SPD increases and increases as the vehicle speed SPD decreases, and increases as the accelerator pedal operation amount ACCP increases and decreases as the accelerator pedal operation amount ACCP decreases. Thus, the deceleration-state inclination factor $\beta b(SPD, ACCP)$ is the same as the acceleration-state inclination factor $\beta a(SPD, ACCP)$ shown in the map MAP$\beta a$ of FIG. 9 in how they increase and decrease. When viewed overall, however, the deceleration-state inclination factor $\beta b(SPD, ACCP)$ tends to be smaller for the same vehicle speed SPD and the same accelerator pedal operation amount ACCP. The deceleration-state inclination factor $\beta b(SPD, ACCP)$ may partially take values identical to those of the acceleration-state inclination factor $\beta a(SPD, ACCP)$, in particular in regions where they take a small or the minimum values.

After step S230 or step S232, the target input shaft speed NINLINE at the time of the acceleration request is calculated based on an acceleration-requesting initial target rotational speed value NINLINE0, an accelerator pedal depression correction value NIN(ACCP), the vehicle speed change correction value NINspd, and an accelerator pedal speed correction value NIN(dACCP, ACCP) (S234), using Formula [10].

$$NINLINE \leftarrow NINLINE0 + NIN(ACCP) + NINspd + NIN(dACCP,ACCP) \quad [10]$$

Figure 11:
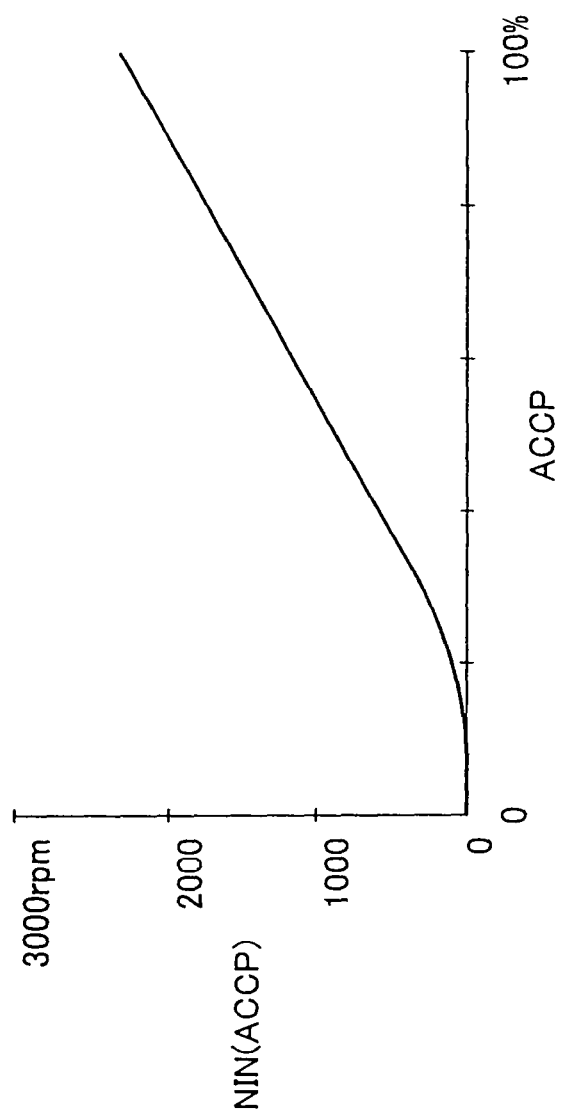
FIG. 11 is a graph showing the relationship between the accelerator pedal operation amount ACCP and the accelerator pedal depression correction value NIN(ACCP)

The acceleration-requesting initial target rotational speed value NINLINE0 is a basic target rotational speed calculated based on the target output POWER at the time immediately before the acceleration request determination is made and the actual vehicle speed SPD using the relationship defined by Formula [3] (FIG. 6) stored in advance, and is the same as the value used normally. The accelerator pedal depression correction value NIN(ACCP) is corresponds to the accelerator pedal operation amount (increase amount) ACCP at the time of the acceleration request, and corresponds to the length of a vertical arrow in the broken line in FIG. 6. The accelerator pedal depression correction value NIN(ACCP) is a function that increases as the accelerator pedal operation amount ACCP increases, and is determined based on the actual accelerator pedal operation amount ACCP using, for example, the relationship shown in FIG. 11. The accelerator pedal speed correction value NIN(dACCP, ACCP) is a function that increases as the accelerator pedal speed dACCP increases and the accelerator pedal operation amount increases, and is determined based on the actual accelerator pedal speed dACCP and the actual accelerator pedal operation amount ACCP.

Then, the target output torque TE is calculated based on the target output POWER at the time of the acceleration request and the acceleration-requesting target input shaft speed NIN-LINE (S236), using Formula [11], which is the same as Formula [4].

$$TE \leftarrow k4 \times POWER/NINLINE \quad [11]$$

In the formula, k4 (which has the same value as k2) is a conversion factor. This process is temporarily exited, and the target value calculation control process (FIG. 2) is then exited. Thereafter, the acceleration-requesting target value calculation process (FIG. 7) is executed as long as the determination result in step S108 of the target value calculation control process (FIG. 2) is NO.

Figure 12:
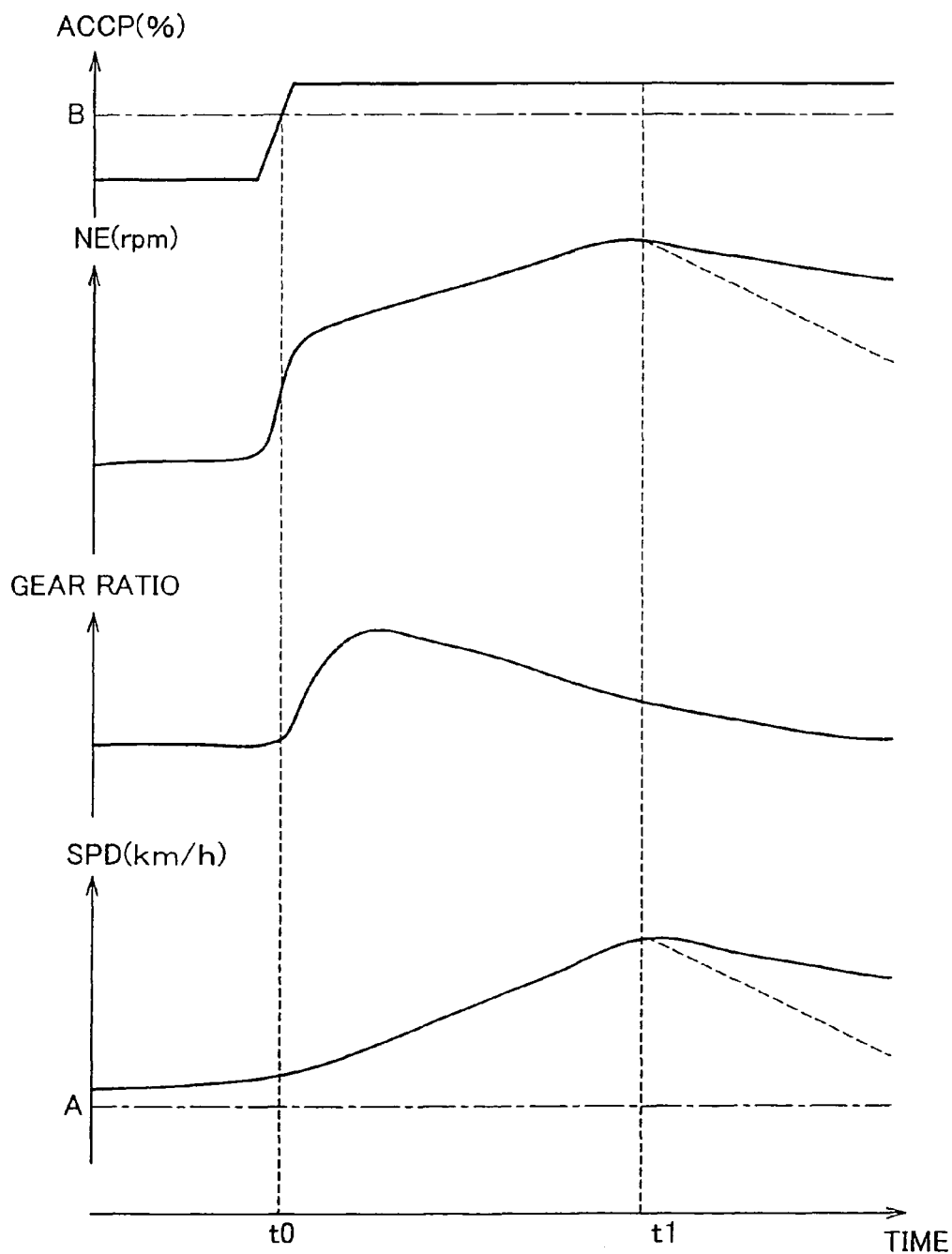
FIG. 12 is a timing chart showing an example of control executed when acceleration is requested in the first embodiment.

Consequently, as shown in FIG. 12, the acceleration-requesting target value calculation process (FIG. 7) is executed after the acceleration request determination (after t0), so that if the vehicle speed SPD (the rotational speed NO of the output shaft 18) increases (t0 to t1), the engine speed NE increases according to the increase in the vehicle speed SPD. The increase in the engine speed NE is caused as follows. The vehicle speed change correction value NINspd is increased at a gradient of the acceleration-state inclination factor βa(SPD, ACCP) as defined by Formula [8], and the vehicle speed change correction value NINspd is reflected in Formula [10] which increases the acceleration-requesting target input shaft speed NINLINE.

However, when the travel resistance increases (after t1) after the vehicle moves from a flat road to an uphill road or due to a strong head wind, the vehicle speed SPD may decrease even without any change in the accelerator pedal operation amount ACCP. That is, a deceleration state may occur even when acceleration is requested. Therefore, Formula [9] functions to decrease the vehicle speed change correction value NINspd at a different gradient of the deceleration-state inclination factor βb(SPD, ACCP). The deceleration-state inclination factor βb(SPD, ACCP) has a value smaller than the acceleration-state inclination factor βa(SPD, ACCP) in all regions. Therefore, the vehicle speed change correction value NINspd decreases to a degree smaller than it would in the case where the acceleration-state inclination factor βa(SPD, ACCP) was used. That is, the decrease in the vehicle speed change correction value NINspd is reduced.

Thus, in the deceleration state, compared to the case where the acceleration-state inclination factor βa(SPD, ACCP) was used (broken line in FIG. 12), the reduction in the target input shaft speed NINLINE is reduced, and the decrease in the actual engine speed NE and the decrease in the vehicle speed SPD are accordingly suppressed, as indicated by the solid line.

Figure 13:
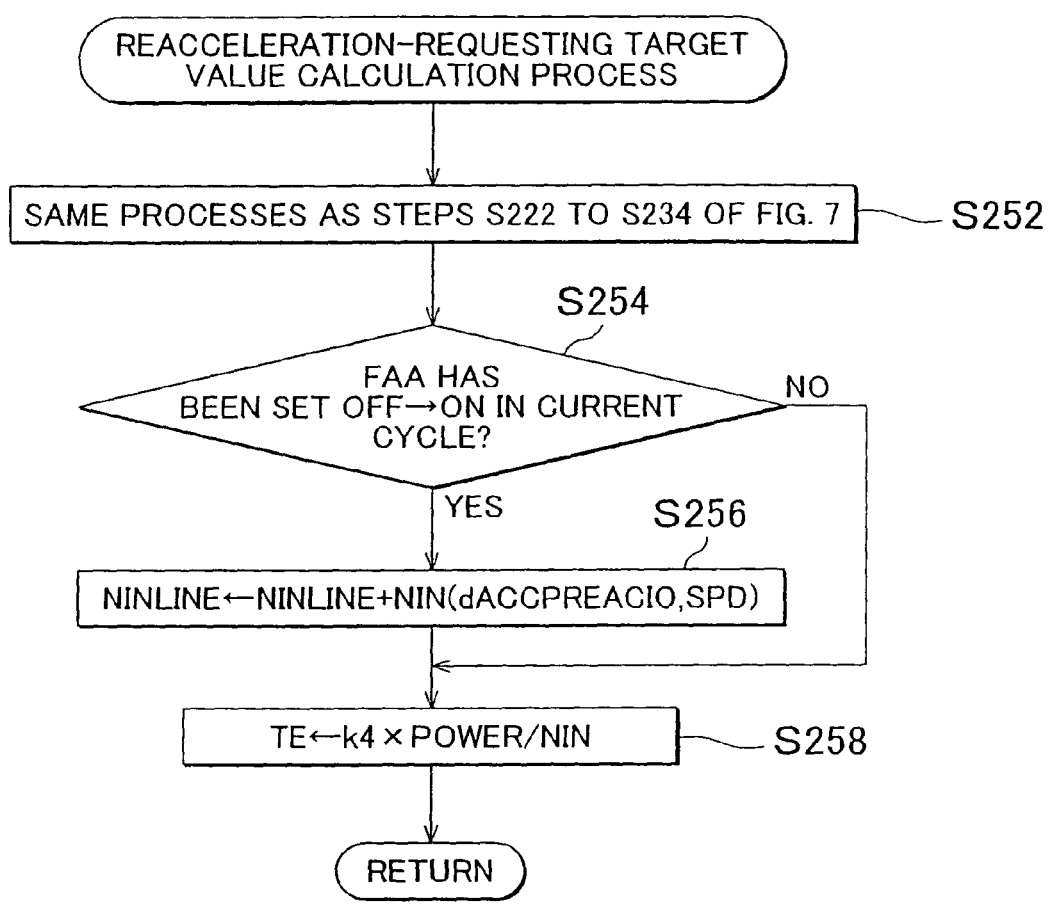
FIG. 13 is a flowchart of a reacceleration-requesting target value calculation process executed by the ECU of the first embodiment.

If the acceleration request flag FA is on (YES in S102) and the reacceleration request flag FAA is also on (YES in S104), a reacceleration-requesting target value calculation process shown in FIG. 13 is executed. In the reacceleration-requesting target value calculation process (FIG. 13), processes identical to those of steps S222 to S234 of the acceleration-requesting target value calculation process (FIG. 7) are first executed (S252). That is, the decrease in the target input shaft speed NINLINE is suppressed in the deceleration state compared to the acceleration state.

Then, it is determined whether the reacceleration request flag FAA has been switched to on in the current cycle (S254). If the reacceleration request flag FAA has been switched to on in the current cycle (YES in S254), the target input shaft speed NINLINE at the time of reacceleration request is calculated based on the actual target input shaft speed NINLINE obtained using Formula [10] and an accelerator pedal speed correction value NIN(dACCPREACIO, SPD) (S256), using the relationship stored in advance and shown in Formula [12].

$$NINLINE \leftarrow NINLINE + NIN(dACCPREACIO,SPD) \quad [12]$$

In the formula, dACCPREACIO represents a reacceleration-requesting initial accelerator pedal speed. The accelerator pedal speed correction value NIN(dACCPREACIO, SPD) is calculated based on the reacceleration-requesting initial accelerator pedal speed and the vehicle speed SPD. For example, the accelerator pedal speed correction value NIN(dACCPREACIO, SPD) may increase as the reacceleration-requesting initial accelerator pedal speed dACCPREACIO and the vehicle speed SPD increase.

Then, if the determination result of step S254 is NO or subsequent to step S256, the target output torque TE is calculated based on the target output POWER at the time of the acceleration request and the acceleration target input shaft speed NINLINE (S258), as defined by Formula [11], in the same way as in step S236 of the acceleration-requesting target value calculation process (FIG. 7). This process is temporarily exited, and the target value calculation control process (FIG. 2) is then exited.

As a result, the target input shaft speed NINLINE at the time of reacceleration request is initially increased stepwise by adding the accelerator pedal speed correction value NIN(dACCPREACIO, SPD) to the acceleration target input shaft speed NINLINE, as defined by Formula [12]. Thereafter, the target input shaft speed NINLINE is obtained in the same way as when acceleration is requested, and adjusted in accordance with the vehicle speed change correction value (vehicle speed integral term) NINspd, as described in the acceleration-requesting target value calculation process (FIG. 7). In adjusting the target input shaft speed NINLINE, the decrease in the target input shaft speed NINLINE is suppressed in the deceleration state compared to the acceleration state as discussed above.

The acceleration-requesting target driving power FORCEACL at the time of reacceleration request is obtained by adding the accelerator pedal depression correction value FORCE(ACCP, SPD) to the value FORCEACL at the time of reacceleration request, which is adopted as the preceding value FORCE0. Consequently, the acceleration-requesting target driving power FORCEACL is increased stepwise, and thereafter gently decreased linearly in accordance with the decrease in the vehicle speed change correction value (vehicle speed integral term) FORCEspd, in the same way as when acceleration is requested.

Figure 14:
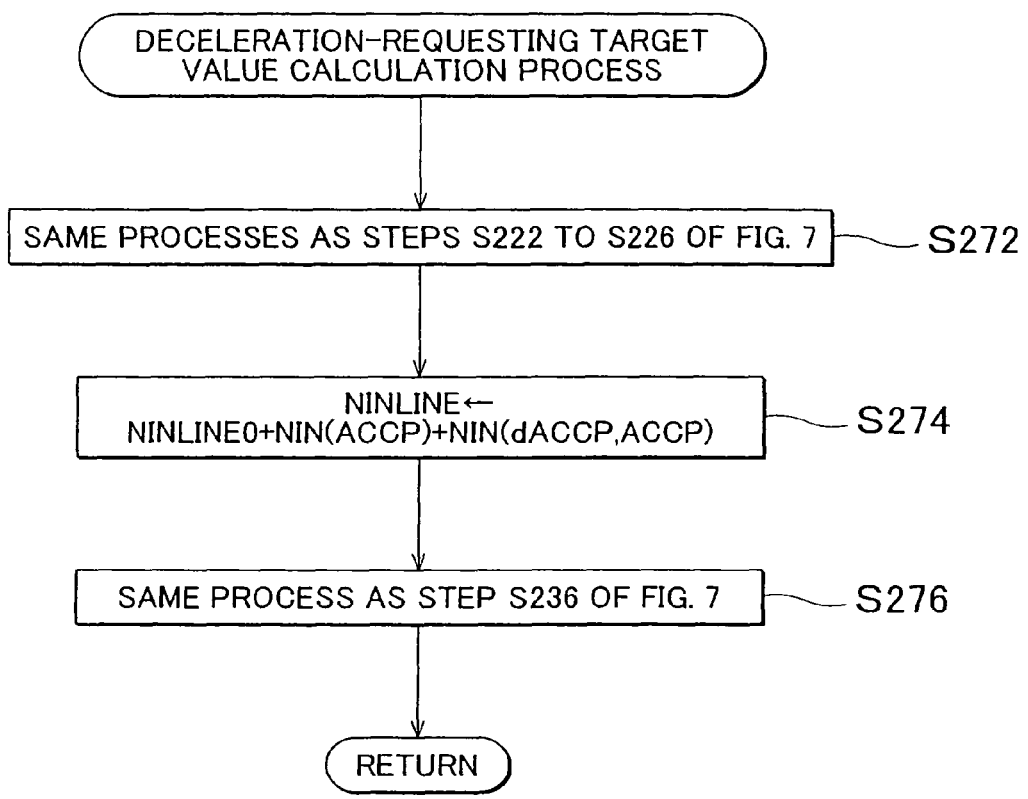
FIG. 14 is a flowchart of a deceleration-requesting target value calculation process executed by the ECU of the first embodiment.

If the acceleration request flag FA is on (YES in S102), the reacceleration request flag FAA is off (NO in S104), and the deceleration request flag FB is on (YES in S106), a deceleration-requesting target value calculation process shown in FIG. 14 is executed.

In the deceleration-requesting target value calculation process (FIG. 14), the same processes as those of steps S222 to S226 of the acceleration-requesting target value calculation process (FIG. 7) are first executed (S272). Consequently, an acceleration target output POWER at the time of deceleration request is calculated.

Then, the target input shaft speed NINLINE at the time of the acceleration request is calculated based on the acceleration-requesting initial target rotational speed value NINLINE0, the accelerator pedal depression correction value NIN(ACCP), and the accelerator pedal speed correction value NIN(dACCP, ACCP) (S274), using Formula [13].

$$NINLINE \leftarrow NINLINE0 + NIN(ACCP) + NIN(dACCP, ACCP) \quad [13]$$

Formula [13] is the same as Formula [10] except that the vehicle speed change correction value NINspd is not provided.

Then, the target output torque TE is calculated (S276) using the same process as step S236 of the acceleration-requesting target value calculation process (FIG. 7). Step S116 of the target value calculation control process (FIG. 2) is terminated, and the target value calculation control process (FIG. 2) is temporarily exited.

In the present invention, the ECU 22 may be considered as an acceleration/deceleration state determination means and rotary driving power source rotational speed change setting means. Step S228, and steps S232, S234, of the acceleration-requesting target value calculation process (FIG. 7) executed by the ECU 22 may be respectively considered as the processes executed by the acceleration/deceleration state determination means and the rotary driving power source rotational speed change setting means. In the reacceleration-requesting target value calculation process (FIG. 13) executed by the ECU 22, the processes equivalent to step S228, and steps S232, S234, in step S252 can be respectively considered as the processes executed by the acceleration/deceleration state determination means and the rotary driving power source rotational speed change setting means.

According to the first embodiment, the following effects can be obtained. (A) In this embodiment, the target input shaft speed NINLINE and the target output torque TE of the CVT 2 are calculated, and the gear ratio of the CVT 2 is controlled based on the target input shaft speed NINLINE, in order to achieve the target output POWER, which is calculated based on the accelerator pedal operation amount ACCP and the vehicle speed SPD. In the thus configured vehicle, in the acceleration-requesting target value calculation process (FIG. 7), reductions in the engine speed NE, which changes in association with changes in the vehicle speed SPD (in this embodiment, the vehicle speed differential Dnoutcvt), are suppressed more in the case where the vehicle speed SPD is determined to indicate a deceleration state (NO in S228) than in the case where it is determined to indicate an acceleration state (YES in S228). The association is established by setting the inclination factor, or the change gradient of the target input shaft speed NINLINE, and reductions in the engine speed NE are suppressed by reducing the association by making the absolute value of the deceleration-state inclination factor βb(SPD, ACCP) of FIG. 10 smaller than the absolute value of the acceleration-state inclination factor βa(SPD, ACCP) of FIG. 9.

Consequently, as shown in FIG. 12, the decrease in the engine speed NE is minimized even if the vehicle is in the deceleration state due to an increase in the travel resistance when acceleration is requested. Therefore, a reduction in the acceleration target output POWER is suppressed, which is not likely to make the driving power insufficient to further decelerate the vehicle. This can avoid making the driver feel uncomfortable.

(B) The engine speed NE changes in association with changes in the requested output (in this embodiment, changes in the accelerator pedal operation amount ACCP), via the target input shaft speed NINLINE, as well as changes in the vehicle speed SPD. Hence, the engine 4 may be controlled smoothly according to requests from the driver.

Figure 15:
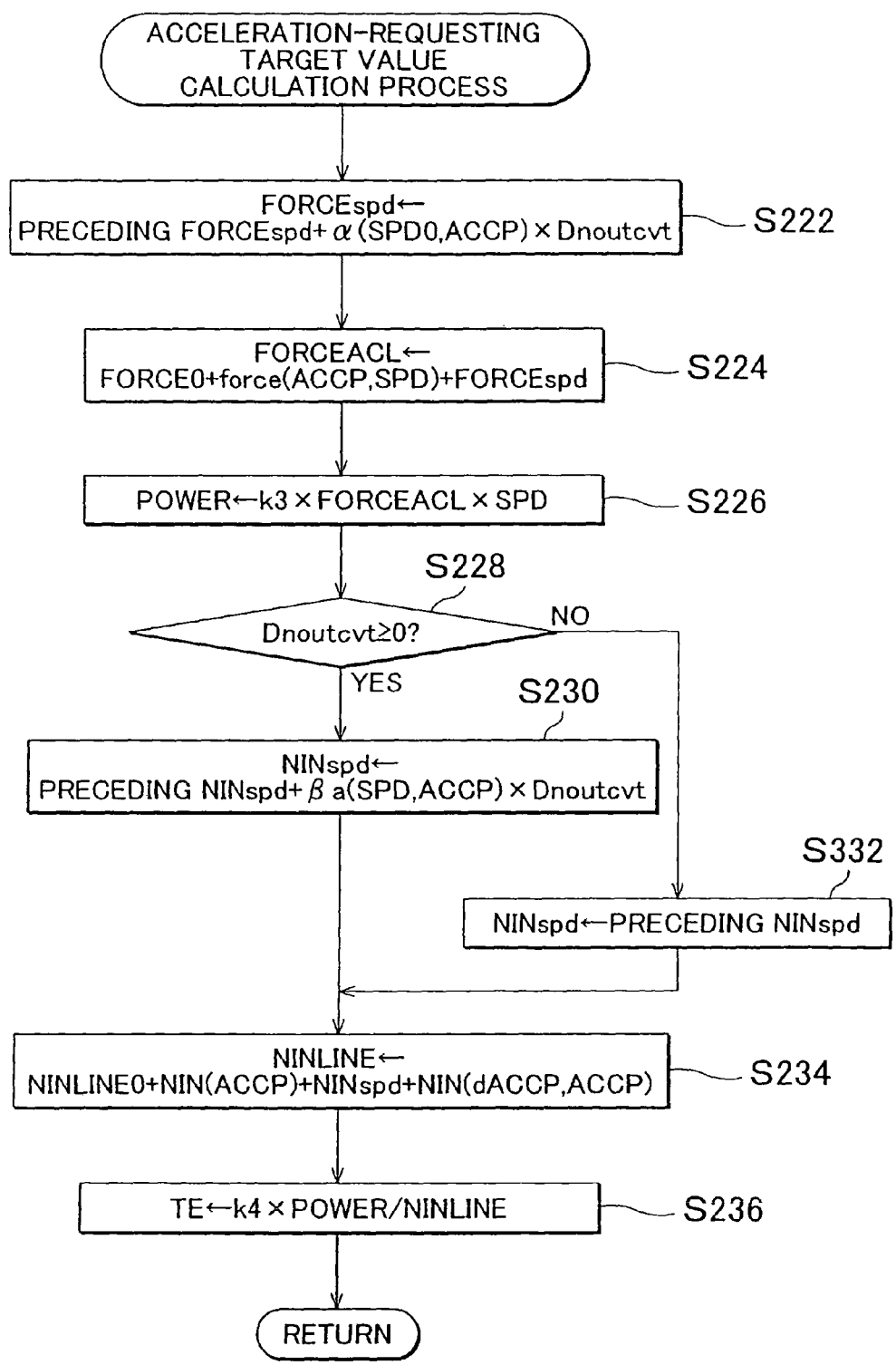
FIG. 15 is a flowchart of an acceleration-requesting target value calculation process executed by an ECU of the second embodiment.

In a second embodiment, the acceleration-requesting target value calculation process shown in FIG. 15 is executed in place of that of FIG. 7. The process of FIG. 15 is different from that of FIG. 7 in that step S332 is executed in place of step S232.

Other steps are identical and denoted by identical step numbers. The same change as FIG. 15 is also applied to FIG. 13. Other configurations are the same as in first embodiment.

In step S332, a calculation is made using Formula [14] rather than Formula [9].

$$NINspd \leftarrow \text{preceding } NINspd \quad [14]$$

That is, if deceleration occurs when acceleration is requested (NO in S228), the vehicle speed change correction value NINspd is not changed but maintained at the same value. In other words; the engine speed NE is not changed in association with changes in the vehicle speed. Because the vehicle speed change correction value NINspd is not changed, step S332 may be omitted so that the process immediately proceeds to step S234 if the determination result of step S228 is NO.

Figure 16:
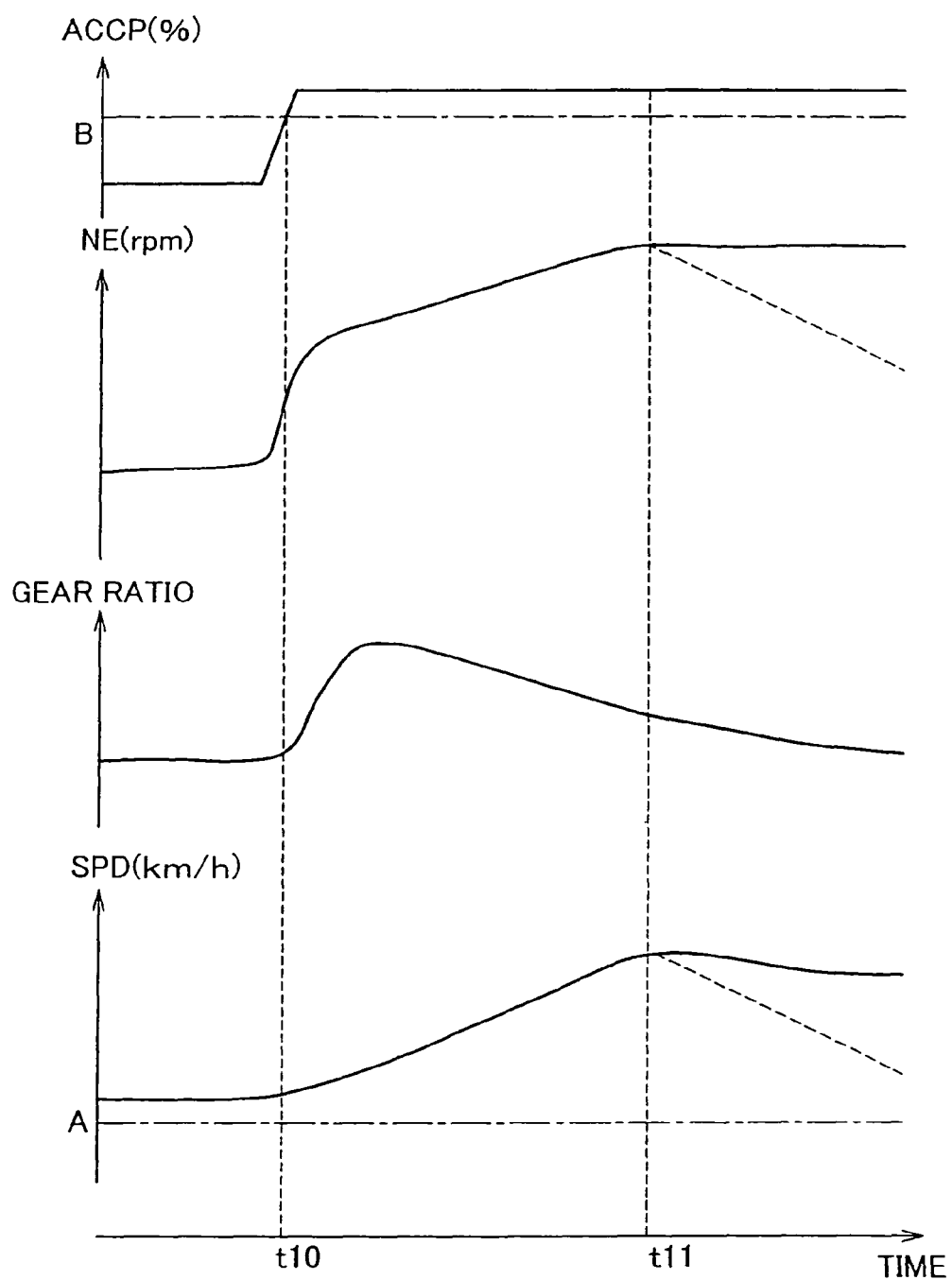
FIG. 16 is a timing chart showing an example of control executed when acceleration is requested in the second embodiment.

In the process described above, as shown in FIG. 16, if the vehicle speed SPD (the rotational speed NO of the output shaft 18) increases (t10 to t11) after the acceleration request determination (after t10), the engine speed NE increases according to the increase in the vehicle speed SPD, in the same way as described in the first embodiment.

However, if the travel resistance increases (after t11) because the vehicle moves from a flat road to an uphill road or due to a head wind, the vehicle speed SPD may decrease even without any change in the accelerator pedal operation amount ACCP. At this time, because the vehicle speed change correction value NINspd is maintained not to be lowered using Formula [14], the vehicle speed change correction value NINspd does not decrease as it would when the acceleration-state inclination factor βa(SPD, ACCP) is used.

Therefore, unlike when the same inclination factor as the acceleration-state inclination factor βa(SPD, ACCP) is also used during deceleration (broken line in FIG. 16), the decrease in the actual engine speed NE and the decrease in the vehicle speed SPD are suppressed as shown by the solid line.

In the present invention, the ECU 22 may be considered as an acceleration/deceleration state determination means and rotary driving power source rotational speed change setting means. Step S228, and steps S332, S234, of the acceleration-requesting target value calculation process (FIG. 15) executed by the ECU 22 may be respectively considered as the processes executed by the acceleration/deceleration state determination means and the rotary driving power source rotational speed change setting means. The same applies to the reacceleration-requesting target value calculation process (FIG. 13) executed by the ECU 22.

According to the second embodiment described above, the following effect is obtained. (A) In addition to the same effects as those of the first embodiment, the engine speed NE is reduced, above all, even if the vehicle decelerates due to an increase in the travel resistance when acceleration is requested. Therefore, reduction of the acceleration target output POWER is suppressed, which is not likely to make the driving power insufficient to further decelerate the vehicle. This more effectively avoids making the driver feel uncomfortable.

Figure 17:
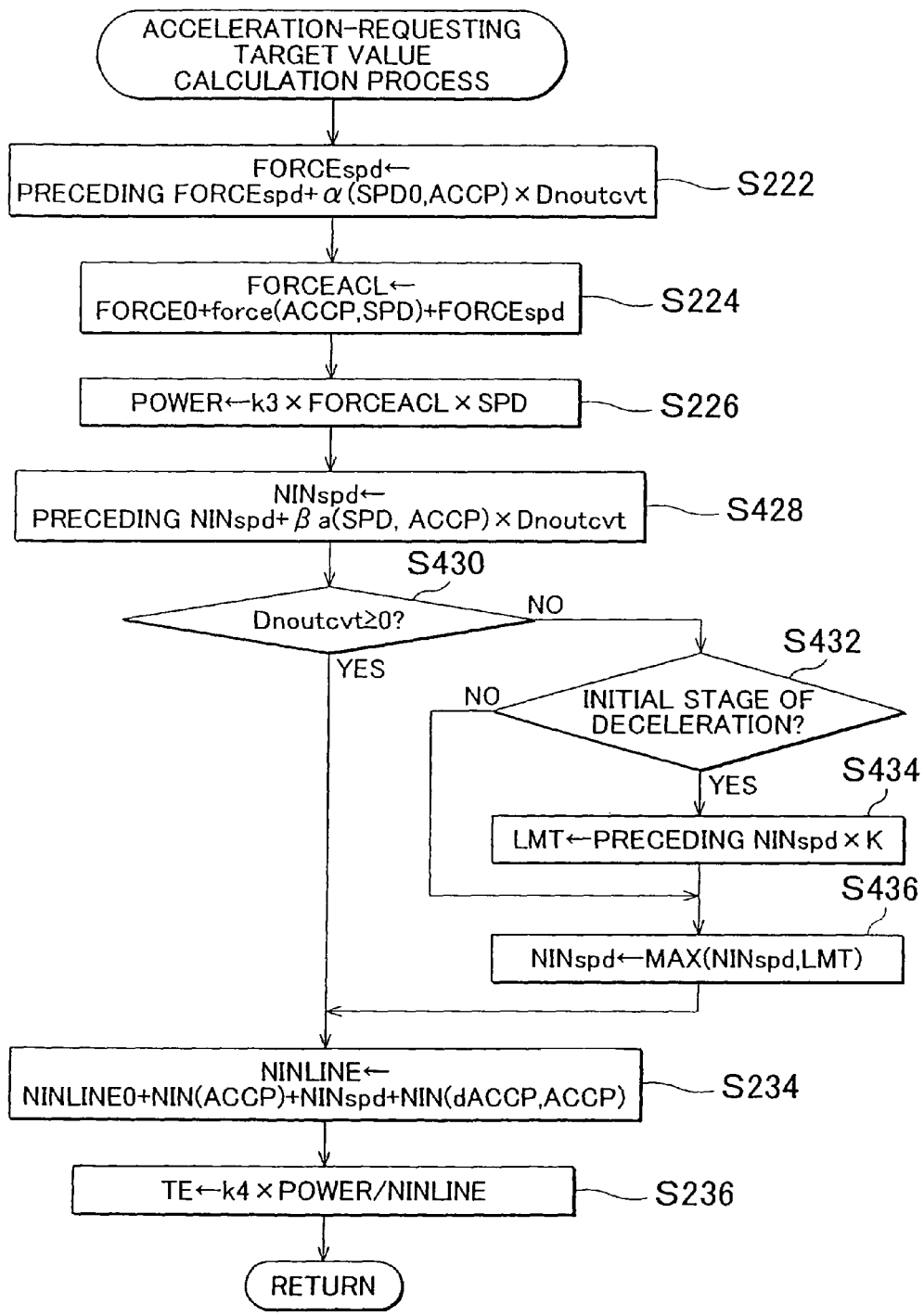
FIG. 17 is a flowchart of an acceleration-requesting target value calculation process executed by an ECU of the third embodiment.

In a third embodiment, the acceleration-requesting target value calculation process shown in FIG. 17 is executed in place of that of FIG. 7. The process of FIG. 17 is different from that of FIG. 7 in that steps S428 to S436 are executed in place of steps S228 to S232. Other steps are identical and denoted by identical step numbers. The same change as FIG. 17 is also applied to FIG. 13. Other configurations are the same as in the first embodiment.

If the acceleration target output POWER is calculated in step S226, the vehicle speed change correction value NINspd is then calculated (S428), using Equation 8. Then, it is determined whether the vehicle speed differential Dnoutcvt≥0 (S430). If Dnoutcvt≥0 (YES in S430), the target input shaft speed NINLINE is then calculated in step S234, and the target output torque TE is calculated in step S236. Thus, if Dnoutcvt≥0, that is, if the vehicle is actually in the acceleration state including constant-speed travel, the same processes as in FIG. 7 follow.

If Dnoutcvt<0 (NO in S430), it is then determined whether the current cycle is in the initial stage of deceleration, that is, the current cycle is the first since Dnoutcvt, which had been equal to or more than 0, became less than 0 (S432). If the current cycle is in the initial stage of deceleration (YES in S432), a lower limit value LMT of the vehicle speed change correction value NINspd is then set based on the vehicle speed change correction value (preceding NINspd) that was obtained in the preceding control cycle (S434), using Formula [15].

$$LMT \leftarrow \text{preceding } NINspd \times K \qquad [15]$$

The coefficient K is a positive number between 0 and 1 (0<K<1). For example, K=0.9. Then, a new vehicle speed change correction value NINspd is calculated based on the current vehicle speed change correction value NINspd and the lower limit value LMT (S436), using Formula [16].

$$NINspd \leftarrow MAX(NINspd, LMT) \qquad [16]$$

In the formula, MAX( ) is an operator that extracts the larger of the values inside the parentheses. Consequently, because the new vehicle speed change correction value NINspd set using Formula [16] is not lower than the value LMT, the decrease in the vehicle speed change correction value NINspd calculated in step S428 in the current cycle is suppressed.

Subsequently, using the vehicle speed change correction value NINspd in which the decrease is suppressed using the lower limit value LMT, the target input shaft speed NINLINE is calculated in step S234, and the target output torque TE is calculated in step S236.

If Dnoutcvt remains below 0 (NO in S430) in subsequent control cycles, the determination result of step S432 is NO so that the decrease in the vehicle speed change correction value NINspd is suppressed after using the fixed lower limit value LMT.

Figure 18:
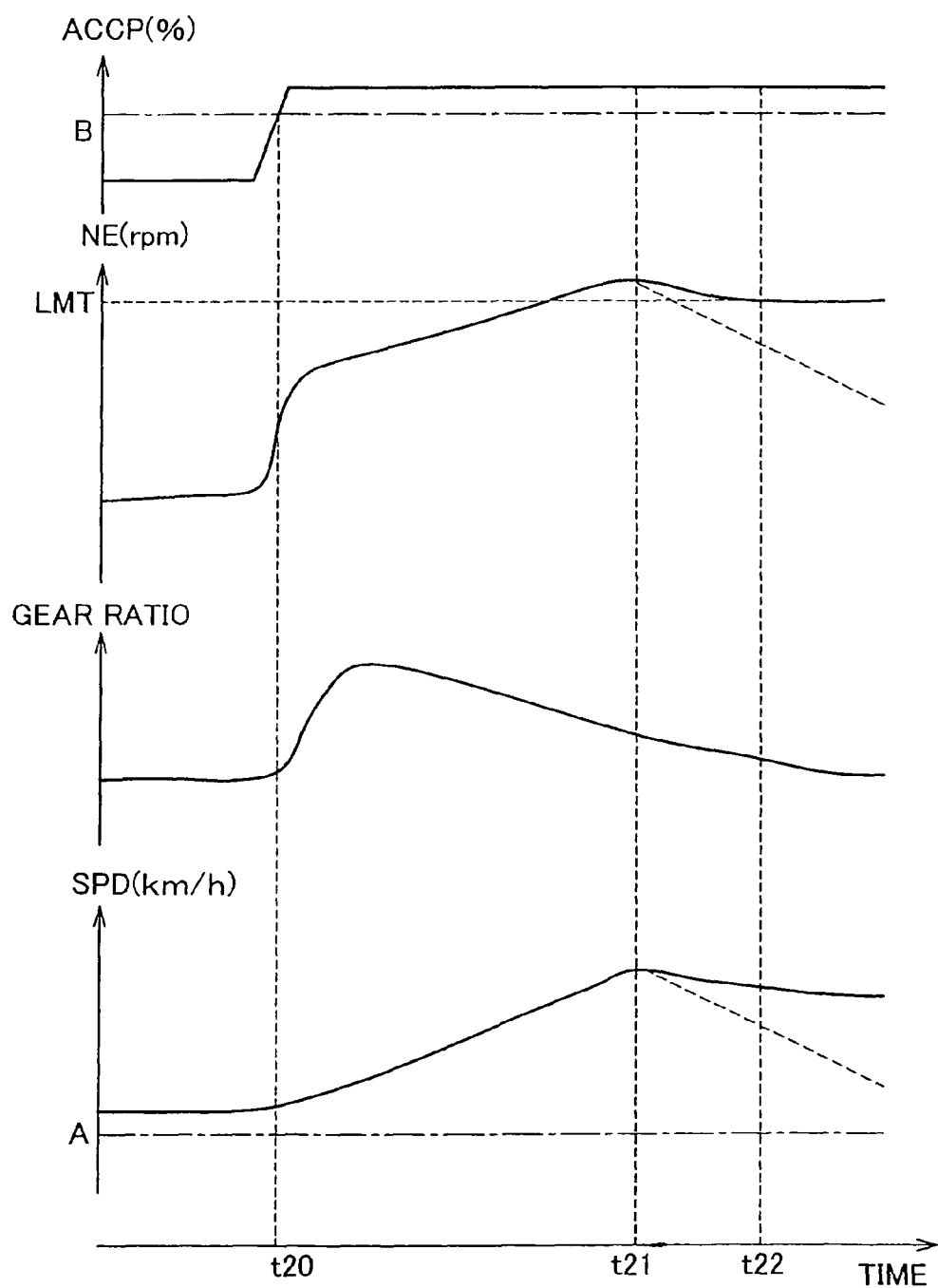
FIG. 18 is a timing chart showing an example of control executed when acceleration is requested in the third embodiment.

Thus, as shown in FIG. 18, if the vehicle speed SPD (the rotational speed NO of the output shaft 18) increases (t20 to t21) after the acceleration request determination (after t20), the engine speed NE increases in accordance with the increase in the vehicle speed SPD, in the same way as described in the first embodiment.

However, if the travel resistance increases (after t11) after the vehicle moves from a flat road to an uphill road or due to a head wind, the vehicle speed SPD may decrease even without any change in the accelerator pedal operation amount ACCP. Because the vehicle speed change correction value NINspd reaches the lower limit value LMT (t22) as defined by Formula [16] when the engine speed NE is reduced slightly, the vehicle speed change correction value NINspd is maintained thereafter. Therefore, the target input shaft speed NINLINE decreases by a degree smaller than the case where it would using the vehicle speed change correction value NINspd using the acceleration-state inclination factor βa(SPD, ACCP).

Therefore, in contrast to the case where the same inclination factor as the acceleration-state inclination factor βa(SPD, ACCP) is also used during deceleration (broken line in FIG. 18), the decrease in the actual engine speed NE and the decrease in the vehicle speed SPD are suppressed, as indicated by the solid line.

In the present invention, the ECU 22 may be considered as acceleration/deceleration state determination means and rotary driving power source rotational speed change setting means. Step S228, and steps S332, S234, of the acceleration-requesting target value calculation process (FIG. 17) may be respectively considered as the processes executed by the acceleration/deceleration state determination means and the rotary driving power source rotational speed change setting means. The same applies to the reacceleration-requesting target value calculation process (FIG. 13) executed by the ECU 22.

According to Embodiment 3 described above, the following effect can be obtained. (A) In addition to the same effects as those of the first embodiment, the engine speed NE is not reduced after being reduced slightly, above all, even if the vehicle decelerates due to an increase in the travel resistance when acceleration is requested. This is because a lower limit of the engine speed NE is provided. Therefore, lowering of the acceleration target output POWER is suppressed, which is not likely to make the driving power insufficient to further decelerate the vehicle. This can more effectively save the driver from feeling uncomfortable.

Other Embodiments (a) In the above embodiments, either one or both of the accelerator pedal depression correction value force(ACCP, SPD) and the vehicle speed change correction value FORCEspd, which are on the right-hand side of Formula [6], may be constants or may be omitted.

Also, the accelerator pedal speed correction value NIN (dACCP, ACCP), which is on the right-hand side of Formula

[10], may be a constant or may be omitted. (b) In the above embodiments, the output torque of the engine 4 is adjusted by adjusting the throttle opening degree TA. However, the output torque of the engine 4 may also be adjusted by adjusting the fuel injection amount.

In the above embodiments, the vehicle is equipped with a gasoline engine. However, the vehicle may instead be equipped with a diesel engine, in which case the output torque is adjusted by adjusting the fuel injection amount. (c) In the target value calculation control process (FIG. 2), it is determined whether the vehicle is traveling on a slippery road (S108). However, such a determination may not be mad.

(d) An acceleration request is determined based on the accelerator pedal operation amount ACCP, which is indicates the amount of output that the driver is requesting the vehicle to make and which indicates the amount of depression of the accelerator pedal 34 in the above embodiments. Alternatively, the acceleration request may be determined based on the throttle opening degree TA, which indicates the opening degree of the throttle valve 30, the fuel injection amount, the amount of intake air inducted through the intake pipe of the engine, and so forth.

(e) In the above embodiments, a belt-type continuously variable transmission is used as the continuously variable transmission. However, continuously variable transmissions of different structures may be used, for example a troidal-type continuously variable transmission.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A driving power source rotational speed control device, provided in a vehicle that outputs power of a rotary driving power source via a continuously variable transmission as driving power for traveling, that changes a rotational speed of the rotary driving power source in association with changes in vehicle speed when acceleration is requested, the driving power source rotational speed control device comprising:
an acceleration/deceleration state determination portion that determines whether the vehicle is accelerating or decelerating when acceleration is requested; and
a controller configured to:
set a change gradient of the rotary driving power source rotational speed to establish the association of the rotary driving power source rotational speed with changes in the vehicle speed when acceleration is requested, the change gradient of the rotary driving power source rotational speed presenting an amount of changes of the rotary driving power source rotational speed when the vehicle speed changes while the acceleration is requested, such that the association of the rotary driving power source rotational speed with changes in the vehicle speed is reduced when the acceleration/deceleration state determination portion determines that the vehicle is decelerating compared to a case where it is determined that the vehicle is accelerating, by suppressing reductions in the rotational speed of the rotary driving power source when the acceleration/deceleration state determination portion determines that the vehicle is decelerating while the acceleration is requested,
wherein in establishing the association of the rotary driving power source rotational speed with changes in the vehicle speed when acceleration is requested by setting the change gradient of the rotary driving power source rotational speed relative to changes in the vehicle speed, the controller sets an absolute value of the change gradient to be smaller when the acceleration/deceleration state determination portion determines that the vehicle is decelerating than when the acceleration/deceleration state determination portion determines that the vehicle is accelerating.

2. The driving power source rotational speed control device according to claim 1, wherein
the controller reduces the association by adjusting the change gradient for the rotational speed of the rotary driving power source in accordance with changes in the vehicle speed.

3. The driving power source rotational speed control device according to claim 1, wherein
the association of the rotary driving power source rotational speed with changes in the vehicle speed is established by changing the target rotational speed of the rotary driving power source in association with changes in the vehicle speed, and
the controller suppresses reductions of the rotary driving power source rotational speed by adjusting the target rotational speed if the acceleration/deceleration state determination portion determines that the vehicle is decelerating.

4. The driving power source rotational speed control device according to claim 1, wherein
the controller changes the rotary driving power source rotational speed in association with changes in a requested output as well as changes in the vehicle speed.

5. The driving power source rotational speed control device according to claim 1, wherein
the rotary driving power source is an internal combustion engine.

6. The driving power source rotational speed control device according to claim 1, wherein
a target input shaft speed of the continuously variable transmission and a target output torque of the rotary driving power source are calculated, and a gear ratio of the continuously variable transmission is controlled based on the target input shaft speed, in order to achieve target driving power, which is calculated based on the requested output and the vehicle speed.

7. The driving power source rotational speed control device according to claim 1, wherein when the acceleration/deceleration state determination portion determines whether the vehicle is accelerating or decelerating when acceleration is requested, the deceleration of the vehicle when acceleration is requested is caused by a travel resistance.

8. A driving power source rotational speed control device, provided in a vehicle that outputs power of a rotary driving power source via a continuously variable transmission as driving power for traveling, that changes a rotational speed of the rotary driving power source in association with changes in vehicle speed when acceleration is requested, the driving power source rotational speed control device comprising:
an acceleration/deceleration state determination portion that determines whether the vehicle is accelerating or decelerating when acceleration is requested; and
a controller configured to:
set a change gradient of the rotary driving power source rotational speed to establish the association of the rotary driving power source rotational speed with changes in the vehicle speed when acceleration is requested, the change gradient of the rotary driving power source rotational speed presenting an amount of changes of the rotary driving power source rotational speed when the vehicle speed changes while the acceleration is requested; and prevent reduction in the rotary driving power source rotational speed in association with reduction in the vehicle speed when the acceleration/deceleration state determination portion determines that the vehicle is decelerating while the acceleration is requested.

9. The driving power source rotational speed control device according to claim 8, wherein when the acceleration/deceleration state determination portion determines whether the vehicle is accelerating or decelerating when acceleration is requested, the deceleration of the vehicle when acceleration is requested is caused by a travel resistance.

10. A driving power source rotational speed control device, provided in a vehicle that outputs power of a rotary driving power source via a continuously variable transmission as driving power for traveling, that changes a rotational speed of the rotary driving power source in association with changes in vehicle speed when acceleration is requested, the driving power source rotational speed control device comprising:
   an acceleration/deceleration state determination portion that determines whether the vehicle is accelerating or decelerating when acceleration is requested; and
   a controller configured to set:
   a change gradient of the rotary driving power source rotational speed to establish the association of the rotary driving power source rotational speed with changes in the vehicle speed when acceleration is requested, the change gradient of the rotary driving power source rotational speed presenting an amount of changes of the rotary driving power source rotational speed when the vehicle speed changes while the acceleration is requested; and set a minimum rotational speed to suppress reduction in the rotary driving power source rotational speed in association with reduction in the vehicle speed, when the acceleration/deceleration state determination portion determines that the vehicle is decelerating while the acceleration is requested.

11. The driving power source rotational speed control device according to claim 10, wherein when the acceleration/deceleration state determination portion determines whether the vehicle is accelerating or decelerating when acceleration is requested, the deceleration of the vehicle when acceleration is requested is caused by a travel resistance.

12. A driving power source rotational speed control method, provided in a vehicle that outputs power of a rotary driving power source via a continuously variable transmission as driving power for traveling, that changes a rotational speed of the rotary driving power source in association with changes in vehicle speed when acceleration is requested, the driving power source rotational speed control method comprising:
   determining whether the vehicle is accelerating or decelerating when acceleration is requested;
   setting a change gradient of the rotary driving power source rotational speed to establish the association of the rotary driving power source rotational speed with changes in the vehicle speed when acceleration is requested, the change gradient of the rotary driving power source rotational speed presenting an amount of changes of the rotary driving power source rotational speed when the vehicle speed changes while the acceleration is requested; and preventing reduction in the rotary driving power source rotational speed in association with reduction in the vehicle speed when it is determined that the vehicle is decelerating while the acceleration is requested.

13. The driving power source rotational speed control method according to claim 12, wherein in determining whether the vehicle is accelerating or decelerating when acceleration is requested, the deceleration of the vehicle when acceleration is requested is caused by a travel resistance.

* * * * *